US008958781B2

(12) United States Patent
Gandhi et al.

(10) Patent No.: US 8,958,781 B2
(45) Date of Patent: *Feb. 17, 2015

(54) SENDING CALLER IDENTIFICATION INFORMATION USING A JOINT SERVICES ACCOUNT

(75) Inventors: Ashish R. Gandhi, Brentwood, CA (US); Mark Gallion, Martinsville, NJ (US); Bindu Balan, Basking Ridge, NJ (US)

(73) Assignees: Verizon Patent and Licensing Inc., Basking Ridge, NJ (US); Cellco Partnership, Basking Ridge, NJ (US)

(*) Notice: Subject to any disclaimer, the term of this patent is extended or adjusted under 35 U.S.C. 154(b) by 264 days.

This patent is subject to a terminal disclaimer.

(21) Appl. No.: 13/594,126

(22) Filed: Aug. 24, 2012

(65) Prior Publication Data
US 2014/0056421 A1    Feb. 27, 2014

(51) Int. Cl.
*H04M 3/42*    (2006.01)

(52) U.S. Cl.
USPC .......................................... 455/415; 455/417

(58) Field of Classification Search
USPC ........ 455/415–420, 414.1, 466, 552.1, 553.1, 455/556.1
See application file for complete search history.

(56) References Cited

U.S. PATENT DOCUMENTS

| | | | | |
|---|---|---|---|---|
| 8,270,956 | B1* | 9/2012 | Mangal | 455/415 |
| 8,544,724 | B2* | 10/2013 | Gilbert et al. | 235/375 |
| 8,750,837 | B2* | 6/2014 | Gandhi et al. | 455/413 |
| 2010/0330970 | A1* | 12/2010 | Skog et al. | 455/415 |
| 2012/0072964 | A1* | 3/2012 | Walter et al. | 725/131 |

* cited by examiner

*Primary Examiner* — Brandon Miller

(57) ABSTRACT

A first network device receives a message that identifies a relationship between a wireless user device and a client device, the relationship is to allow for caller identification information, for calls associated with the wireless user device, to be sent to the client device. The first network device stores the information identifying the relationship. The first network device receives caller identification information for a call associated with the wireless user device. The first network device determines to send the caller identification information to the client device, based on the information identifying the relationship stored by the first network device; and the first network device sends the caller identification information to the client device.

20 Claims, 16 Drawing Sheets

SENDING CALLER IDENTIFICATION INFORMATION USING A JOINT SERVICES ACCOUNT

BACKGROUND

When a phone call is made from a first user device to a second user device, the user of the second user device may be able to view the name (of the user of the first user device) and/or phone number associated with the first user device. The name and/or phone number may be defined as the caller identification ("caller ID") information.

DETAILED DESCRIPTION OF PREFERRED EMBODIMENTS

The following detailed description refers to the accompanying drawings. The same reference numbers in different drawings may identify the same or similar elements.

Systems and/or methods described herein may set up and activate a joint account that allows for sending caller ID information, relating to incoming and/or outgoing calls to/from a wireless user device, to one or more types of devices, such as a set top box. For example, a user may set up a joint account that allows for selecting to send caller ID information intended for display on a wireless user device (associated with one account) to another device (e.g., a set top box) associated with another account. Once the joint account is created, a user may receive caller ID information via the wireless user device and via the other device whenever the wireless user device receives an incoming phone call and/or whenever the user, of the wireless user device, makes an outgoing phone call.

Figure 1A:
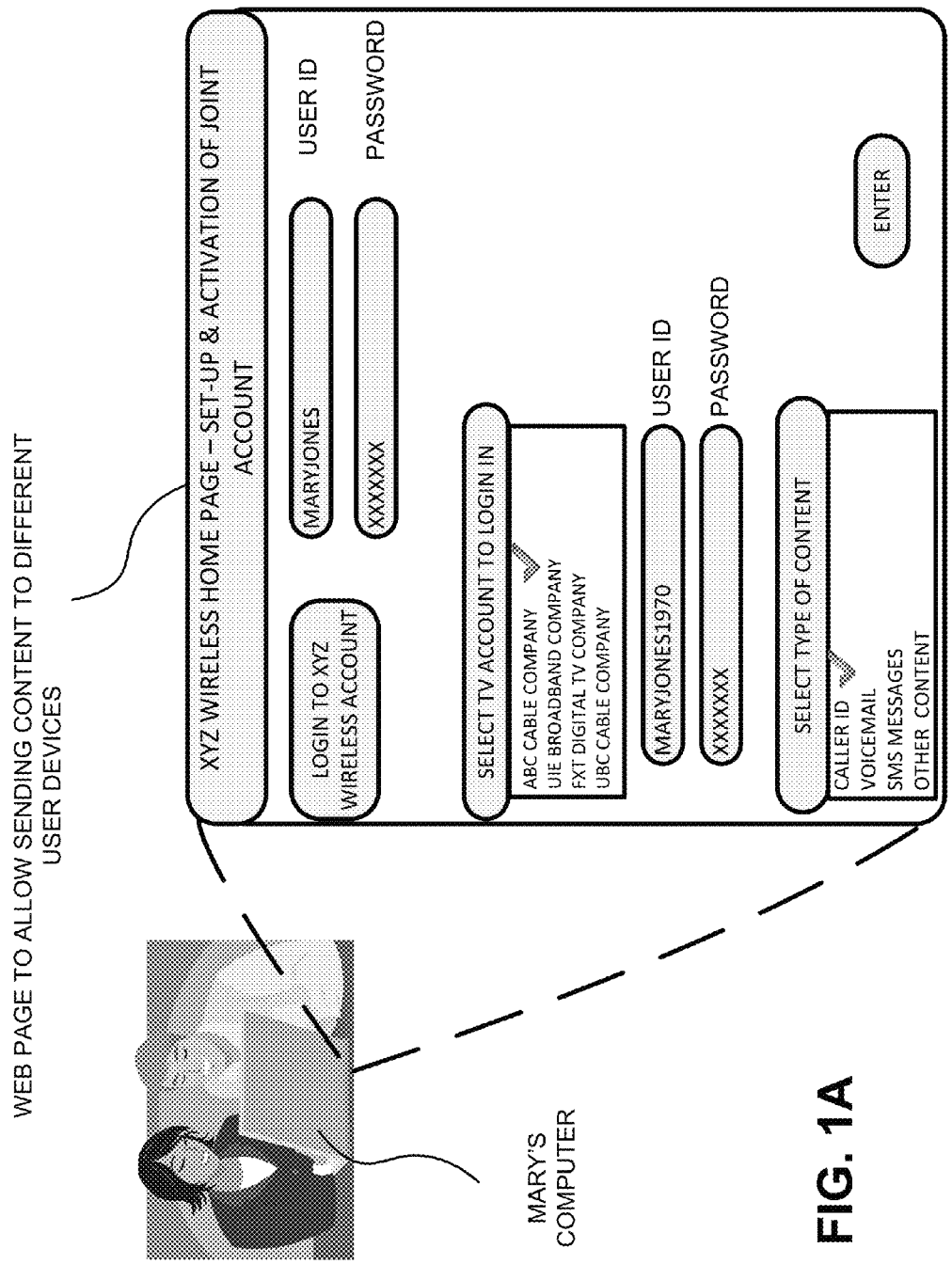
FIGS. 1A-1C are diagrams of an overview of an implementation described herein.
Figure 1B:
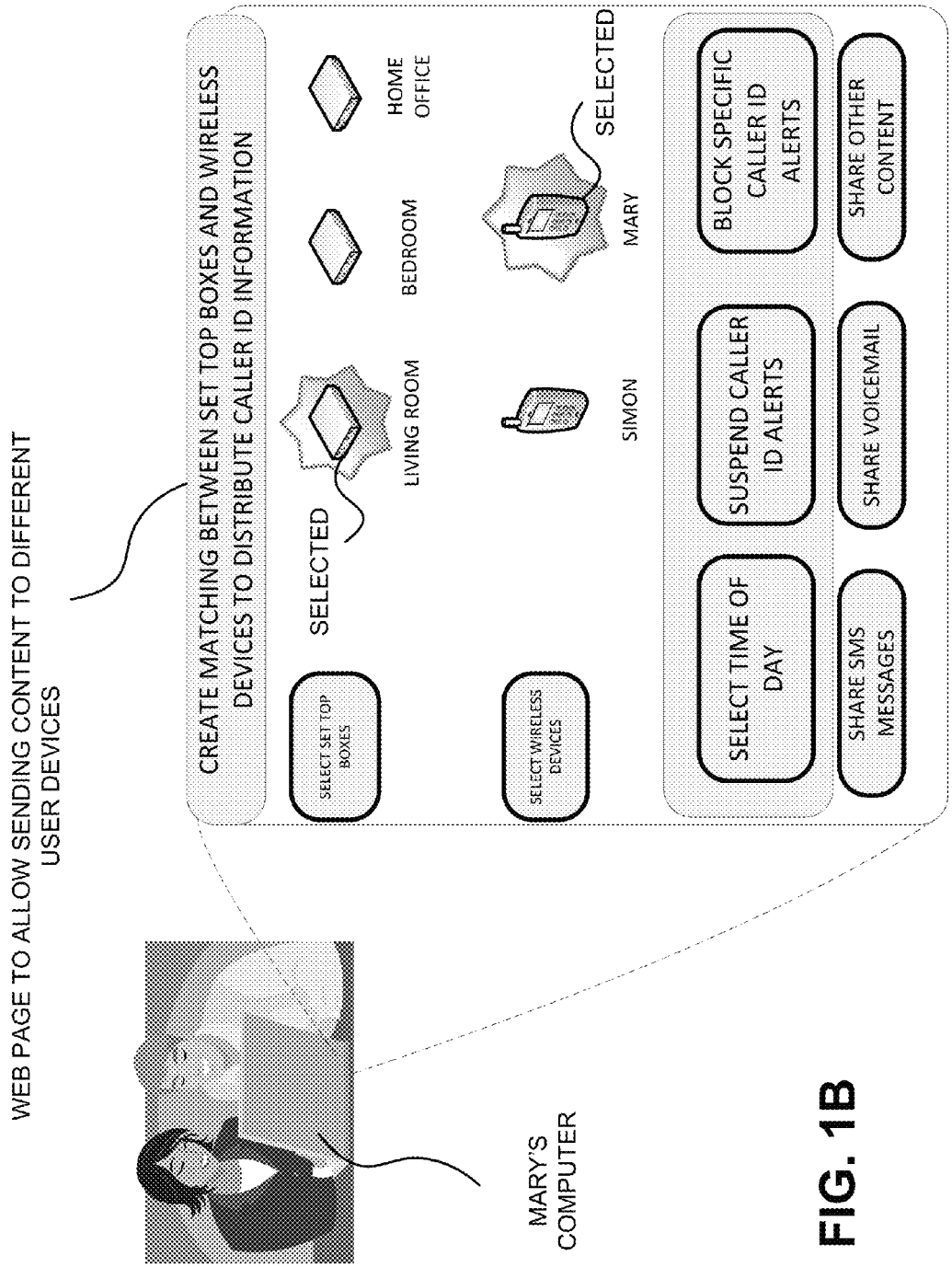
Figure 1C:
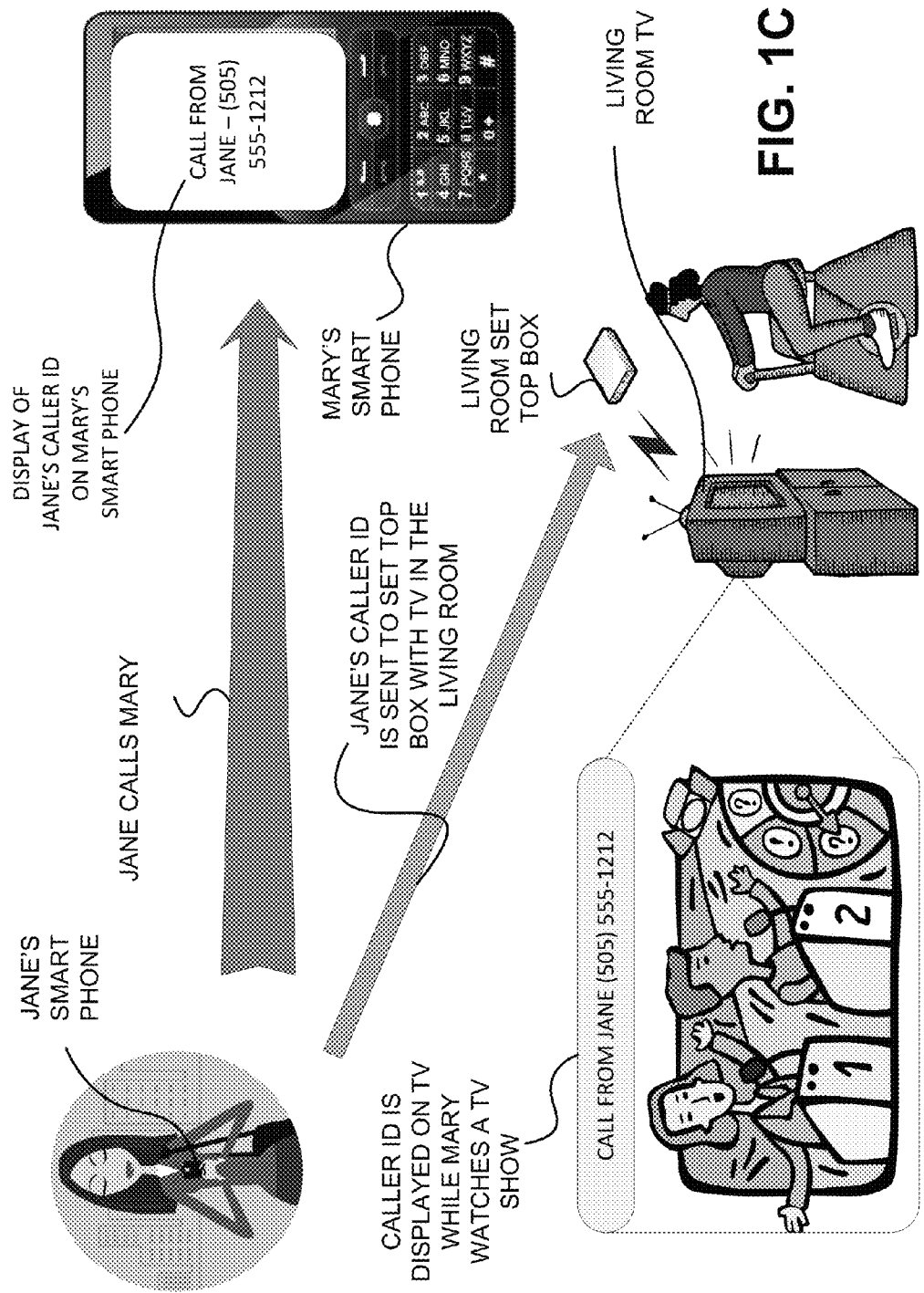

FIGS. 1A-1C are diagrams of an overview of an implementation described herein. FIGS. 1A-1C shows Mary's computer, Mary's smart phone, Jane's smart phone, a living room set top box, and a living room television. In practice, there may be additional or fewer devices. As shown in FIG. 1A, Mary may be using a web page (provided by Mary's wireless service provider—XYZ Wireless), on her computer, to set up and activate a joint account that will allow Mary to send content, intended for one user device, to other user devices. Each of the different user devices (e.g., smart phones, landline phones, set top boxes, etc.) may be serviced by different providers (e.g., wireless service, phone company, cable company, etc.). The web page may have various login and account selection information that Mary has to provide before content can be sent to the different user devices. Mary may have to enter her login information (user ID and password) for her wireless account. Once Mary has entered her login information for her wireless account (and received confirmation that the login information is valid), the web page may request Mary to select a second account with which to receive content that is intended for a user device serviced by XYZ Wireless. For the second account, Mary selects ABC Cable, which provides cable television service at Mary's home.

Mary enters her login information (e.g., user ID and password) for her account with ABC Cable. Once the ABC cable account login information is validated, the web page may request Mary to select the type of content that Mary would like to have sent to her cable television account. Mary decides to select caller ID information.

As shown in FIG. 1B, the web page may display information, to Mary, about the available user devices that can receive the caller ID information. For example, the web page may display all of the set top boxes that are used in Mary's cable television service from ABC Cable. Also, the web page may display all of the wireless devices that Mary has with XYZ Wireless. Mary has the option to send content (such as caller ID information), intended for her smart phone, to one or more of the set top boxes. Mary also has the option of choosing to send content, intended for Simon's smart phone, to one or more of the set top boxes. As shown in FIG. 1B, Mary decides to select to send caller ID information intended for Mary's smart phone (labeled as "Mary" on the web page) to the set top box in the living room.

Mary may also have other options for sending content. Mary may be able to send caller ID information according to the time of day. For example, Mary may decide that she would like to have incoming caller ID information, intended for her smart phone, to be sent to the living room set top box only during certain times of the day. Mary may also have the option to suspend caller ID information. For example, Mary may decide to go on vacation and may be able to temporarily suspend sending caller ID information to the living room set top box. Mary may also be able to block caller ID information. For example, Mary may decide that incoming calls, from her sister's smart phone to Mary's smart phone, should not be sent to the living room set top box.

With all the information provided for the joint account, the web page may provide Mary with a joint account identifier and password. In the future, Mary may use the joint account identifier and password to login into the joint account to perform actions related to sending content to user devices serviced by XYZ Wireless and ABC Cable.

As shown in FIG. 1C, Jane, using her smart phone (Jane's smart phone), makes a call to Mary's smart phone. Mary's smart phone may be on or off. Assume that Mary's smart phone is on. At the time Jane calls Mary, Mary is exercising in front of the living room television and Mary has left her smart phone in the bedroom. When Mary's smart phone receives the call from Jane's smart phone, Jane's caller ID information is also communicated to a set top box in the living room that provides content to a living room television. The living room set top box sends the caller ID information to the living room television. The living room television receives Jane's caller ID information and Jane's caller ID information ("Jane (505) 555-1212") may be displayed on the living room television.

As a result, a user may be able to send caller ID information intended for one user device (e.g., a smart phone) to one or more other user devices. This may provide the user with a level of flexibility in their ability to view the caller ID information on different user devices associated with different service providers.

Figure 2:
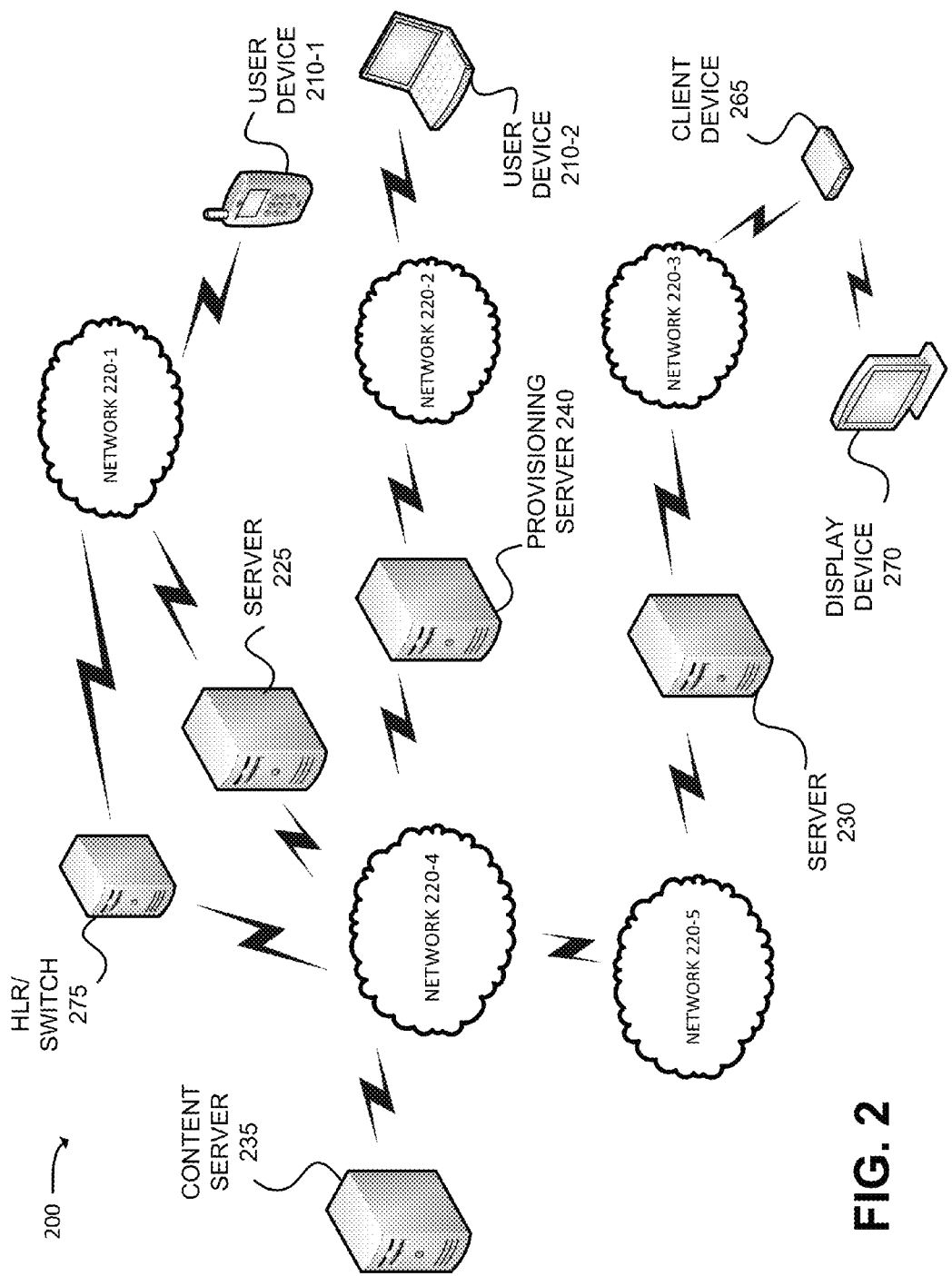
FIG. 2 is a diagram of an example environment in which systems and/or methods described herein may be implemented.

FIG. 2 is a diagram of an example environment 200, in which systems and/or methods described herein may be implemented. The quantity of devices and/or networks illustrated in FIG. 2 is provided for explanatory purposes only. In practice, there may be additional devices and/or networks; fewer devices and/or networks; different devices and/or networks; or differently arranged devices and/or networks than illustrated in FIG. 2. Also, in some implementations, one or more of the devices in environment 200 may perform one or more functions described as being performed by another one or more of the devices in environment 200. Devices of environment 200 may interconnect via wired connections, wireless connections, or a combination of wired and wireless connections.

As shown in FIG. 2, environment 200 may include a user device 210-1, user device 210-2, network 220-1, network 220-2, network 220-3, network 220-4, network 220-5, server 225, server 230, content server 235, provisioning server 240, client device 265, display device 270, and home location register/switch 275 (hereinafter referred to as "HLR/switch 275").

User device 210-1 and user device 210-2 (referred to collectively as "user devices 210" and individually as "user device 210") may include any computation or communication device that is capable of communicating with a network (e.g., network 220). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, a television, a set top box, a digital video recorder (DVR), or another type of mobile computation or communication device.

User devices 210 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream). In some implementations, content may include caller ID information, SMS messages, and/or voicemail information.

User device 210 may include a variety of applications, such as, for example, an e-mail application, a telephone application, a camera application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.). Various features of some of the above applications may be part of the content.

Network 220-1, network 220-2, network 220-3, network 220-4, and/or network 220-5 (referred to collectively as "networks 220" and individually as "network 220") may include one or more wired and/or wireless networks. Any two or more of networks 220 may be implemented as a single network, even though networks 220 are shown as separate networks in FIG. 2.

Network 220 may include a cellular network, a public land mobile network (PLMN), a second generation (2G) network, a third generation (3G) network, a fourth generation (4G) network, a fifth generation (5G) network and/or another network. Additionally, or alternatively, network 220 may include a local area network (LAN), wide area network (WAN), a metropolitan network (MAN), a telephone network (e.g., the Public Switched Telephone Network (PSTN)), an ad hoc network, an intranet, the Internet, a satellite network, a GPS network, a fiber optic-based network, and/or combination of these or other types of networks. Additionally, or alternatively, network 220 may support secure communications via a private network (e.g., a virtual private network (VPN) or a private IP VPN (PIP VPN), and/or secure communications via a public network.

Additionally, or alternatively, network 220 may include a radio access network (RAN), such as a long term evolution (LTE) network, that may include a variety of components to facilitate mobile communications, such as antennas, base stations, mobile switching centers, and interfaces with Public Switched Telephone Networks (PSTNs) and/or packet data servicing nodes (PDSNs).

Additionally, or alternatively, network 220 may include another type of wireless local area network, such as a network based on ultra wide band (e.g., bandwidth>500 MHz) communications. Examples of standards that are based on ultra wide band (UWB) may include wireless Universal Serial Bus (WUSB) and WiNet (Internet Protocol over UWB), as well as Bluetooth™ over ultra wide band. Examples of other standards related to UWB may include Multi-Band Orthogonal Frequency Division Multiplexing (MB-OFDM) and Direct Sequence UWB (DS-UWB).

Additionally, or alternatively, network 220 may include a wireless fidelity (WiFi) network or another type of wireless network that includes another device (e.g., a server and/or wireless router) to facilitate communication between user devices 210. In some implementations described herein, user device 210 may automatically select a wireless network interface among different types of wireless network interfaces that are available on user device 210 for transferring information. User device 210 may select the wireless network interface based on a variety of factors, including, for example, the wireless network interface with the smallest power consumption.

Server 225 and server 230 may include one or more network devices, or other types of computational or communication devices, that gather, process, search, store, and/or provide information in a manner described herein. Server 225 may store identifier information for a user, of user device 210, and/or identifier information of user device 210. Server 225 may store relationships between different user devices 210 and client devices 265, and information regarding what content is to be distributed based on those relationships. Server 230 may store identifier information for a user, of user device 210, and/or identifier information of client device 265. Server 230 may store relationships between different user devices 210 and client devices 265, and information regarding what content is to be distributed based on those relationships.

Content server 235 may include one or more network devices, or other types of computational or communication devices, that gather, process, search, store, and/or provide information in a manner described herein. Content server 235 may store content that may be sent to different user devices 210 and/or different client devices 265. Content server 235 may store information about which server 225 and/or server 230 is/are to receive content. In one example implementation, content server 235 may send caller ID information to server 230. In another example implementation, content server 235 may store and send SMS message information to server 230. In another example implementation, content server 235 may store and send voicemail information to server 230. In another example implementation, content server 235 may store and send content to server 225 and/or server 230. In another example implementation, content server 235 may store and send a combination of one or more of caller ID, SMS message, voicemail, or any other type of content to server 225 and/or server 230. The functions of content server 235 may be implemented by server 225 and/or serve 230.

Provisioning server 240 may include one or more network devices, or other types of computational or communication devices, that gather, process, search, store, and/or provide information in a manner described herein. Provisioning server 240 may receive information on which user devices 210 and/or client devices 265 is/are to receive content. Provisioning server 240 may receive user identification and password information for different content providers (e.g., wireless and cable television). Provisioning server 240 may send information regarding the relationship between one or more user devices 210 and one or more client devices 265 to server 225 and/or server 230. In some implementations, provisioning server 240 may be a part of server 230. The functions of provisioning server 240 may be implemented by a single server 230 or by multiple servers 230. In some implementations, provisioning server 240 may be part of server 225. The functions of provisioning server 240 may be implemented by a single server 225 or by multiple servers 225.

Client device 265 may include any computational or communication device that is capable of communicating with a network (e.g., network 220) and may be capable of storing information. For example, client device 265 may correspond to a set top box, cable card, digital video recorder (DVR), TV tuner card, computer, or any other device that is capable of outputting audio and/or video media, including music, images, television content, video content, etc., and/or other types of information, such as text. Functions, described above as being performed by client device 265, may be performed by user device 210. Additionally, or alternatively, functions, described above as being performed by user device 210, may be performed by client device 265.

Display device 270 may include a device that is capable of displaying and/or storing information. Display device 270 may display images, television content, video content, and/or other types of information. For example, display device 270 may correspond to a television, a monitor, or any other type of display screen.

HLR/switch 275 may include a network device, such as a gateway, a router, a switch, a firewall, a network interface card (NIC), a hub, a bridge, a proxy server, an optical add-drop multiplexer (OADM), or some other type of device that processes and/or transfers data. HLR/switch 275 may transmit/receive voice and data between user device 210 and other user devices similar to user device 210. HLR/switch 275 may connect calls by switching digital voice data packets from one network path to another, and may provide information that supports mobile service subscribers, such as user registration and authentication information.

Additionally, or alternatively, HLR/switch 275 may include one or more network devices, or other types of computation or communication devices, that gather, process, search, and/or provide information in a manner described herein. In some implementations, HLR/switch 275 may include one or more databases of subscriber information for a mobile network, such as network 220. HLR/switch 275 databases may be maintained by a subscriber's home carrier and may include pertinent user information, such as address information, account status information, user preferences information, etc.

In some implementations, the messages sent between each of the devices, shown in FIG. 2, may be associated with an Internet Protocol (to be referred to as "IP") address. The IP address may be IP version 4 (IPv4), IP version 6 (IPv6), or any other IP version. The IP address may be a public IP address or a private IP address. In some implementations, the messages sent between of the devices, shown in FIG. 2, may be associated with a session initiation protocol (SIP) message.

Figure 3:
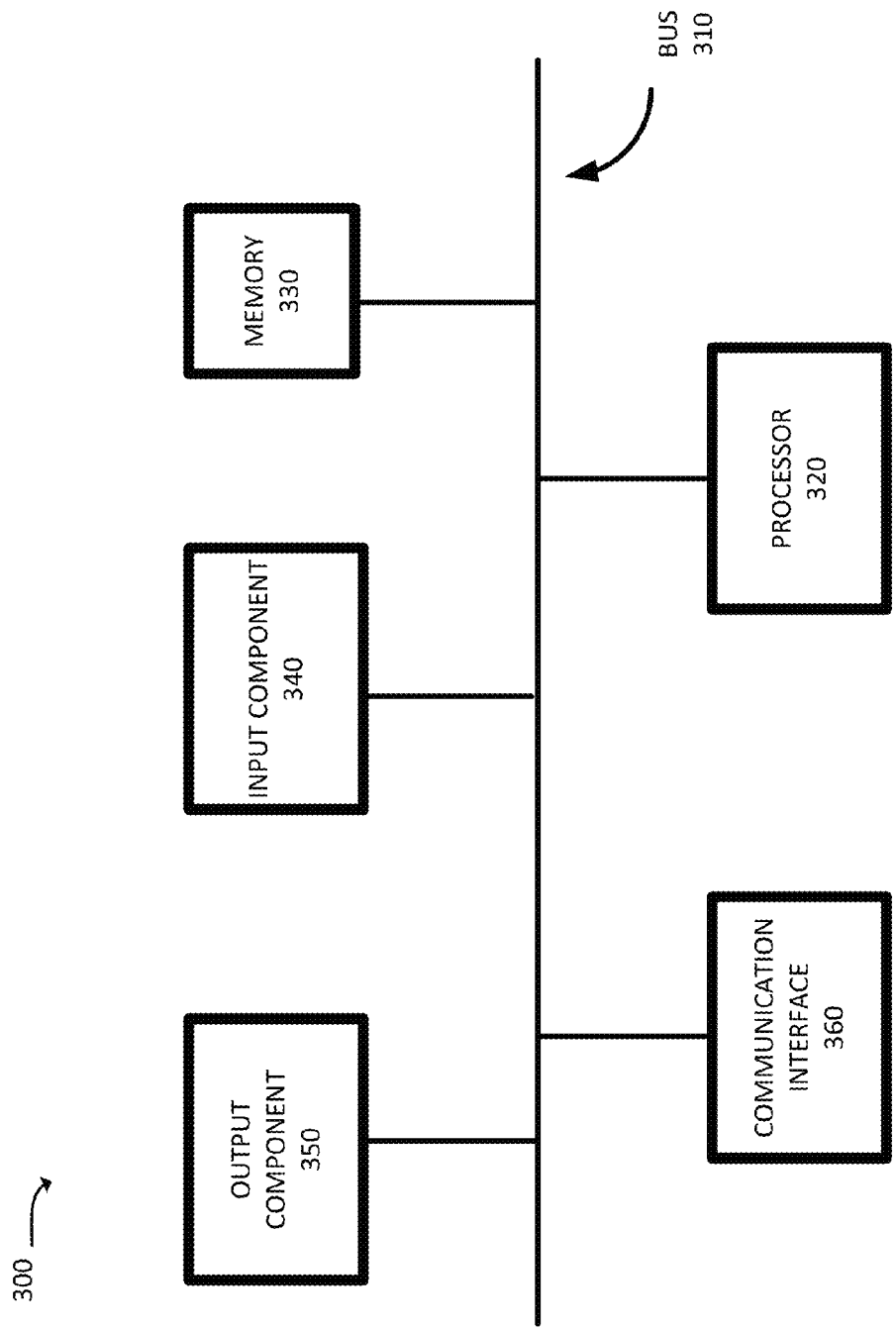
FIG. 3 is a diagram of example components of one or more devices of FIGS. 1A-1C and FIG. 2.

FIG. 3 is a diagram of example components of a device 300. Device 300 may correspond to user device 210, server 225, server 230, content server 235, provisioning server 240, client device 265, and/or HLR/switch 275. Alternatively, or additionally, user device 210, server 225, server 230, content server 235, provisioning server 240, client device 265, and/or HLR/switch 275 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic (e.g., a field programmable gate array (FPGA) or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communication interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with network 220 and/or devices connected to network 220.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
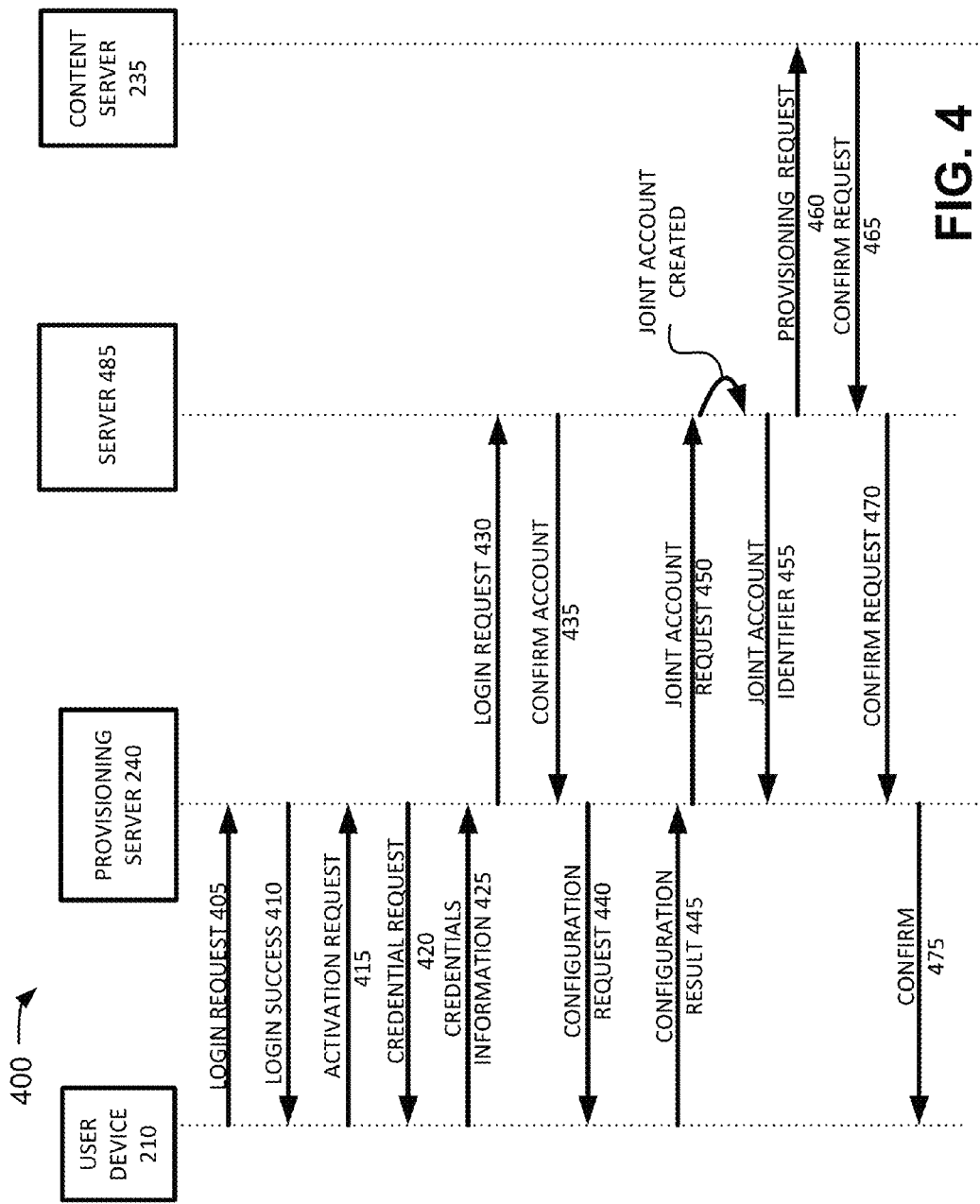
FIG. 4 is a call flow diagram of an example process for creating a joint account to send content.

FIG. 4 is a call flow diagram of an example process capable of being performed by an example portion 400 of environment 200. As shown in FIG. 4, portion 400 may include user device 210, content server 235, provisioning server 240, and server 485. User device 210, content server 235, and provisioning server 240 may include components and/or perform functions described above in connection with, for example, one or more FIGS. 1-3.

In one example implementation, provisioning server 240 may be a part of a network that provides content to server 230. Assume that provisioning server 240 and server 230 are part of a network that provides television programming content to client device 265, such as a set top box or another type of device, described with regard to FIG. 2. In this example implementation, server 485 may correspond to server 225, described with regard to FIG. 2. Server 485 may correspond to server 225 or multiple servers 225. Assume that server 485 is part of a network that provides content to user device 210 (e.g., a smart phone, or other types of user devices described with regard to FIG. 2). In this example implementation, the user, of user device 210, may decide to set-up and activate a joint account to send content (e.g., caller ID, voicemail, SMS messages, etc.), intended for user device 210, to client device 265.

In another example implementation, provisioning server 240 may be a part of a network that provides content to server 225. Assume that provisioning server 240 and server 225 are part of a network that provides content to user device 210 (e.g., a smart phone, or other user devices described with regard to FIG. 2). In this example implementation, server 485 may correspond to server 230, describe with regard to FIG. 2. Server 485 may correspond to server 230 or multiple servers 230. Assume that server 485 is part of a network that provides television programming content to client device 265, such as a set top box or another type of device, described with regard to FIG. 2. In this example implementation, the user, of user device 210, may decide to set-up and activate a joint account to send content (e.g., video content, programming guide content, etc.), intended for client device 265, to user device 210.

The user, using user device 210, may begin the process of creating a joint account by sending login request 405 to provisioning server 240, as shown in FIG. 4. The user may enter login request 405 via a user interface (e.g., a web page). The user interface may use an application programming interface (API) to send messages to provisioning server 240. In one example implementation, login request 405 may include the user name and password for an account, such as a cable television account, associated with server 230. In another example implementation, login request 405 may include the user name and password for an account, such as a wireless service account, associated with server 225.

Provisioning server 240 may receive login request 405. Provisioning server 240 may analyze login request 405 and determine that login request 405 is a request to log into a first account (e.g., a wireless account, a cable television account, etc.) associated with the user.

In one example implementation, provisioning server 240 may send a message to server 225 and request server 225 to determine whether the information (e.g., user name, password), regarding the first account (e.g., a wireless account), in login request 405 is valid. Provisioning server 240 may receive a message, from server 225, that the login information in login request 405, for the first account, is valid.

In another example implementation, provisioning server 240 may send a message to server 230 and request server 230 to determine whether the information (e.g., user name, password), regarding the first account (e.g., a cable television account) in login request 405 is valid. Provisioning server 240 may receive a message, from server 230, that the login information in login request 405, for the first account, is valid.

In another example implementation, provisioning server 240 may determine whether the information in login request 405, regarding the first account, is valid. In some implementations, as described above, the first account may be a wireless account, or may be a cable television account. Provisioning server 240 may determine that login request 405 is valid.

Provisioning server 240 may generate a message to be sent to user device 210 to confirm that the user has successfully logged in. Provisioning server 240 may generate login success 410. Provisioning server 240 may send login success 410 to user device 210.

User device 210 may receive login success 410. User device 210 may analyze login success 410 and determine that a message be generated and displayed for the user. The user may view the message, associated with login success 410, that the user is successfully logged into the first account. To continue creating the joint account, the user, using user device 210, may generate a message, requesting the creation of a joint account. User device 210 may receive the input from the user and user device 210 may generate activation request 415. User device 210 may determine that activation request 415 be sent to provisioning server 240. User device 210 may send activation request 415 to provisioning server 240.

Provisioning server 240 may receive activation request 415. Provisioning server 240 may analyze activation request 415 and determine that activation request 415 includes a request to create a joint account. Provisioning server 240 may determine that, to create a joint account, user device 210 may need to send information about a second account which can receive content from the first account.

Provisioning server 240 may generate credential request 420 to request user device 210 to send information about the second account. Provisioning server 240 may send credential request 420 to user device 210. User device 210 may receive credential request 420. User device 210 may analyze credential request 420 and determine that a message be generated and displayed to the user. The message may include a request for the user to provide information about a second account which may receive content associated with the first account. The user may view the message, associated with credential request 420, on user device 210. The user may enter information about the second account, and use user device 210 to send credentials information 425 to provisioning server 240. Provisioning server 240 may receive credentials information 425.

In one example implementation, credentials information 425 may include the user name (or other identification, such as a phone number) and password for a second account that is associated with user device 210 (e.g., a wireless account). In another example implementation, credentials information 425 may include a user identification and password for a second account that is associated with client device 265, such as a cable television service. In another example implementation, credentials information 425 may include information about a second account that is associated with an identifier (such as an MDN) of another user device 210, such as a wireless device that is used by another user. For example, the user, of user device 210, may enter the MDN of a wireless device that is owned by the user's spouse who has a separate wireless account from the user.

Provisioning server 240 may analyze credentials information 425 and determine that a login request message be sent to server 485 which is associated with the second account. Provisioning server 240 may generate login request 430.

Provisioning server 240 may send login request 430 to server 485. Login request 430 may include information described in one or more of the example implementations of credentials information 425 described above. In one example implementation, login request 430 may be similar to credentials information 425. In another example implementation, login request 430 may be a modified message based on credentials information 425. In another example implementation, login request 430 may be a new message based on credentials information 425.

Server 485 may receive login request 430. Server 485 may analyze login request 430 and determine that login request 430 is a request to obtain permission to obtain account information from the second account so that content may be distributed devices associated with to both the first account and the second account. In one example implementation, server 485 may determine that the user name and password for the second account is valid. In another example implementation, server 485 may send a request to another user device 210 that is a part of a different account (e.g., a different wireless account). Server 485 may receive an authorization from the other user (e.g., a friend or family member), of the other user device 210 to allow for sending content from the other user device 210 to client device 265. Server 485 may determine that the second account is authenticated. Server 485 may generate confirm account message 435. Server 485 may send a confirm account message 435 to provisioning server 240. Provisioning server 240 may receive confirm account message 435.

Provisioning server 240 may analyze confirm account message 435 and determine that the login information (in login request 430) for the second account is authenticated. Provisioning server 240 may determine that the first and second accounts are authenticated, and a request is to be sent to user device 210 to configure different user devices 210 and different client devices 265 to receive the same content.

Provisioning server 240 may generate configuration request 440. Configuration request 440 may include information about user devices 210 and client devices 265 that are associated with the first and second accounts. Provisioning server 240 may send configuration request 440 to user device 210. User device 210 may receive configuration request 440. User device 210 may analyze configuration result 440 and determine that a message be generated that requests the user to determine which user devices 210 and/or client devices 265 are to receive content. User device 210 may generate a message displayed to the user that the second account is successfully validated. The message may include a request for the user to configure which user devices 210 and which client devices 265 are to display the same content.

User device 210 may analyze configuration request 440 and determine that a list of user devices 210 and client devices 265 (associated with the first account and the second account) be generated and displayed for the user. The user may view the list on user device 210 that includes the available user devices 210 and the available client devices 265 that may receive content. The list may include user devices 210, such as smart phones and/or other devices on the user's wireless account. The list may include other user devices 210 that are serviced by a different wireless account (e.g., a friend's wireless account).

The list may also include a list of client devices 265 (such as set top boxes) that are provided content by server 230. For example, the list may include set top boxes located in a living room area, bedroom area, office area, or any other location.

The user may choose different user devices 210 and client devices 265, from the list and create relationships between these different devices. The user may have the option to create relationships, using user device 210, to send the same content to: one user device 210 and one client device 265; one user device 210 and multiple client devices 265; multiple user devices 210 and one client device 265; or to send the same content to multiple user devices 210 and multiple client devices 265.

For example, the user may choose to have caller ID information, intended for the user's smart phone (user device 210), to be sent to a set top box (client device 265) that provides television programming content to a bedroom television. Alternatively, the user may, for example, choose to send television programming, intended for a television (via client device 265, such as a set top box), to be sent to the user's smart phone (user device 210).

The user may have an option to determine an interval of time when content may be sent. For example, the user may select (using user device 210) that content, intended for a smart phone (e.g., user device 210), can only be sent to a set top box (client device 265) from 9:00 a.m. to 8:00 p.m., Monday to Friday. Additionally, or alternatively, the user may select that content, intended for a smart phone (user device 210), can only be sent to a set top box (client device 265) from 7:00 p.m. to 10:00 p.m., Thursday to Sunday.

The user may have an option to suspend the distribution of content to other user devices 210 and/or client devices 265. For example, the user may decide to suspend sending content, intended for a smart phone (e.g., user device 210), to a set top box in the living room for a one week interval of time in June. Before, and after, the one week interval of time, the set top box in the living room may receive the content. The user may also be able to suspend sending content to a set top box during a specific television program (e.g., no caller ID alerts during the evening news on a specified television channel).

The user may have an option to block specific content. For example, the user may decide that incoming caller ID information (to the user's smart phone) from a smart phone associated with a particular telephone number, or associated with a telephone number not on a list of telephone numbers, should not be sent to a set top box (client device 265) in the living room.

The user may have the option of choosing the type of content that may be distributed to different user devices 210 and/or client devices 265. For example, the user may send caller ID information, SMS messages, voicemail, audio content, video content, text content, and/or multimedia content to different user devices 210 and/or client devices 265.

User device 210 may send configuration result 445 to provisioning server 240. Provisioning server 240 may receive configuration result 445. Provisioning server 240 may analyze configuration result 445 and determine that configuration result 445 includes the type of content to be sent to one or more user devices 210 and/or to one or more client devices 265; when the content is to be sent to one or more user devices 210 and/or to one more client devices 265; and which of the one or more user devices 210 and/or the one or more client devices 265 are to receive the content.

In one example implementation, provisioning server 240 may analyze configuration result 445 and determine that a message (including information from configuration result 445) be sent to server 225. Provisioning server 240 may send the message to a particular server 225 that is associated with a selected user device 210. Server 225 may receive the message and store the information associated with configuration result 445. Server 225 may use the information to determine which user device 210 is to receive content that is intended for client device 265. Server 225 may send the information associated with configuration result 445 to other network devices that may be used in the distribution of content specified in configuration result 445.

In another example implementation, provisioning server 240 analyze configuration result 445 and determine that a message (including information from configuration result 445) be sent to server 230. Provisioning server 240 may send the message to a particular server 230 that is associated with a selected client device 265. Server 230 may receive the message and store the information associated with configuration result 445. Server 230 may use the information to determine which client device 265 is to receive content that is intended for user device 210. Server 230 may send the information associated with configuration result 445 to other network devices that may be used in the distribution of content specified in configuration result 445.

Provisioning server 240 may analyze configuration result 445 and determine that a joint account be created. Provisioning server 240 may determine that the request for a joint account be sent to server 485. Provisioning server 240 may generate joint account request 450. Provisioning server 240 may send joint account request 450 to server 485.

Server 485 may receive joint account request 450. Server 485 may analyze joint account request 450 and server 485 may create a joint account that allows for the distribution of content to user device 210 and/or client device 265. Server 485 may create a joint account name and/or password, either of which may be changed by the user at a later time. Server 485 may determine that joint account request 450 includes information that is included in configuration result 445.

Server 485 may also create a billing code associated with the joint account. The billing code may be used to bill the user for the ability to distribute content to user device 210 and client device 265. The billing code could be the joint account identifier, or the billing code could be a different identifier. The billing code may be used by server 485 to notify other network devices to allow for the distribution of content to user device 210 and/or client device 265.

In one example implementation, if server 485 corresponds to server 225, server 485 may send a message to other network devices (e.g., HLR/switch 275) that are used to send content, intended for user device 210, to client device 265.

In another example implementation, if server 485 corresponds to server 230, server 485 may send a message to other network devices, associated with providing television programming, that are used to send content, intended for client device 265, to user device 210.

Server 485 may determine that joint account information be sent to provisioning server 240. Server 485 may generate joint account identifier 455. Server 485 may send joint account identifier 455 to provisioning server 240. Provisioning server 240 may receive joint account identifier 455 from server 485.

In one example implementation, provisioning server 240 may send a message to server 225 that includes the joint account identifier and password information. This may allow the user to log into the joint account through a user interface (e.g., a web page) associated with server 225. In another example implementation, provisioning server 240 may send a message to server 230 that includes the joint account identifier and password information. This may allow the user to login into the joint account through a user interface (e.g., a web page) associated with server 230.

Server 485 may determine that the information from configuration result 445 be sent to content server 235. Server 485 may generate provisioning request 460. Server 485 may send provisioning request 460 content server 235.

Content server 235 may receive provisioning request 460. In one example implementation, content 235 may analyze provisioning request 460 and determine that provisioning request 460 includes information about which selected server 230 is to receive content intended for user device 210. The selected server 230 is based on which client device 265 is specified by the user in configuration result 445. For example, content server 235 may receive a message from HLR/switch 275 (associated with a selected user device 210) to send caller ID information to a particular server 230 associated with client device 265 that is specified, in configuration result 445, to receive the caller ID information.

In another example implementation, content 235 may analyze provisioning request 460 and determine that provisioning request 460 includes information about which server 225 is to receive content intended for client device 265. The selected server 225 is based on which user device 210 is specified by the user in configuration result 445. For example, content server 235 may receive a message from server 230 (associated with a selected client device 265) to send content (e.g., multimedia content, programming content, guide content, etc.) to a particular server 225 associated with user device 210, that is specified in configuration result 445, to receive the content.

Upon updating content server 235 with which server 225 (or server 230) is to receive information based on configuration result 445, content server 235 may generate a confirm request message 465. Content server 235 may send confirm request message 465 to server 485. Server 485 may receive confirm request message 465. Server 485 may analyze confirm request message 465 and server 485 may determine that a confirmation message be sent to provisioning server 240. Server 485 may generate confirm request message 470. Server 485 may send confirm request message 470 to provisioning server 240. In one example implementation, confirm request message 470 may be similar to confirm request message 465. In another example implementation, confirm request message 470 may be a modified version of confirm request message 465. In another example implementation, confirm request message 470 may be a new message based on confirm request message 465.

Provisioning server 240 may receive confirm request message 470. Provisioning server 240 may analyze confirm request message 470 and provisioning server 240 may determine to send a confirmation message to user device 210. Provisioning server 240 may generate confirm message 475. Provisioning server 240 may send confirm message 475 to user device 210. In one example implementation, confirm message 475 may be similar to confirm request message 470. In another example implementation, confirm message 475 may be a modified version of confirm request message 470. In another example implementation, confirm message 475 may be a new message based on confirm request message 470.

User device 210 may receive confirm message 475. User device 210 may analyze confirm message 475 and may determine that the configuration request (initially provided in configuration result 445) is confirmed. User device 210 may generate a message that may be viewed by the user of user device 210, that the configuration request is successfully initiated.

With a joint account, the user may use the joint account identification and password through a web page (or other user interface) associated with the user's account served by server 225, or associated with the user's account served by server 230. The user may use the joint account to send a message, similar to configuration result 445, to provisioning server 240 that may allow the distribution of other types of content at the same time.

For example, if the user set up the joint account to send caller ID information, the user, using user device 210, may send an additional message, similar to configuration result 445, to provisioning server 240 to request to send television program content, from a selected client device 265, to a selected user device 210. The user may also use the joint account to send the same content (e.g., caller ID information) and/or different content (e.g., different caller ID information) to a different client device 265. The user may also use the joint account to change which one or more user devices 210 and client devices 265 are to receive content. Alternatively, the user may use the joint account to stop sending content to user device 210 or client device 265. For example, the user may send another message, similar to configuration result 445 to stop sending caller ID information. This may result in other network devices (e.g., content server 235) being notified to remove information associated with configuration result 445.

Figure 5:
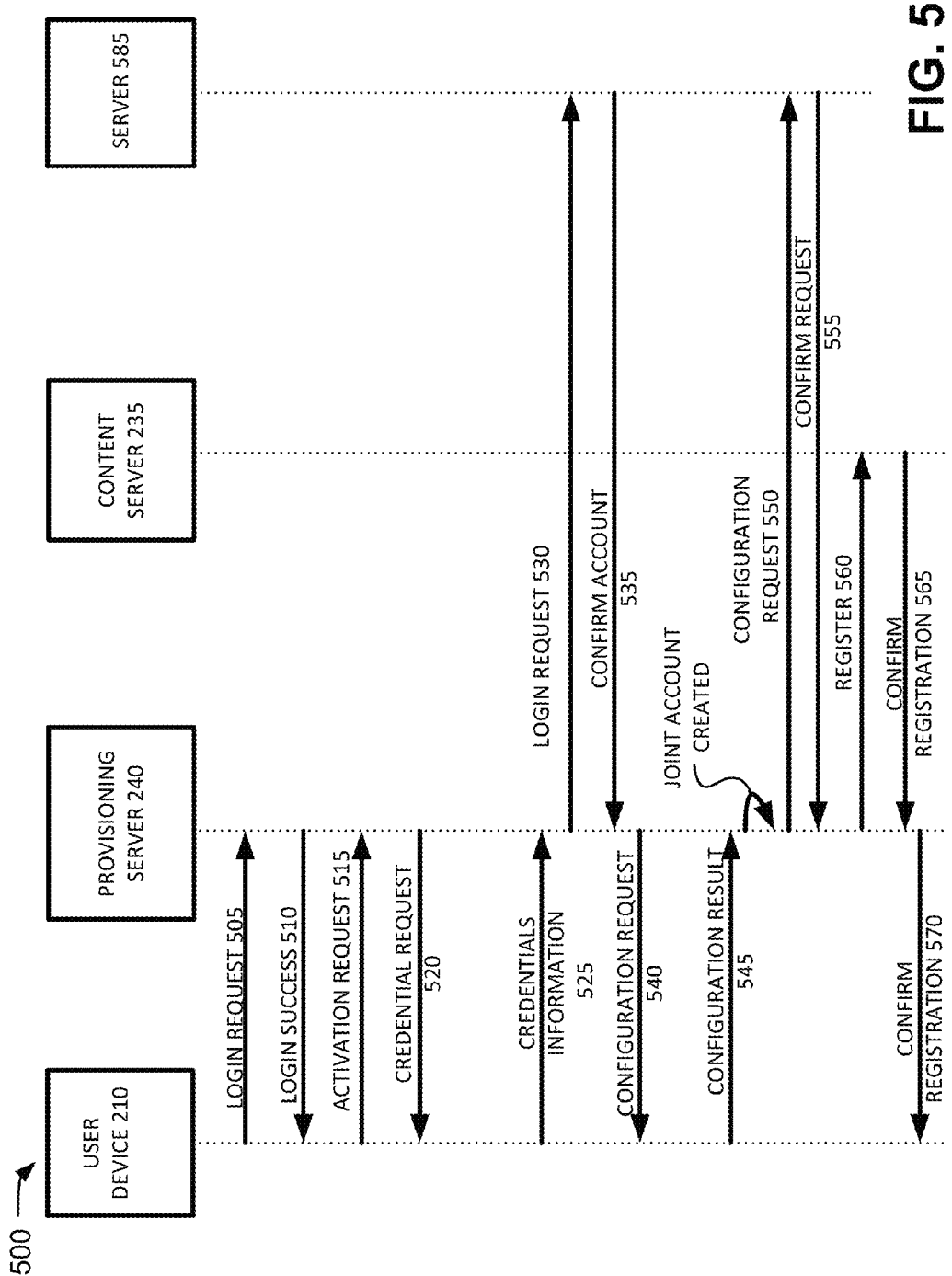
FIG. 5 is a call flow diagram of an example process for creating a joint account to send content.

FIG. 5 is a call flow diagram of an example process capable of being performed by an example portion 500 of environment 200. As shown in FIG. 5, portion 500 may include user device 210, provisioning server 240, and content server 235. User device 210, provisioning server 240, and content server 235 may include components and/or perform functions described above in connection with, for example, one or more FIGS. 1-3.

In one example implementation, provisioning server 240 may be a part of the network that provides content to server 225. Assume that provisioning server 240 and server 225 are part of a network that provides content (e.g., caller ID information) to user device 210 (e.g., smart phone, or other types of user devices 210 described in FIG. 2). In this example implementation, server 585 may correspond to server 230, described with regard to FIG. 2. Alternatively, server 485 may correspond to multiple servers 230. Assume that server 485 is part of a network that provides television programming content to client device 265, such as a set top box or another type of client device 265, described with regard to FIG. 2. The user, of user device 210, may decide to set-up and activate a process to send content (e.g., caller ID, voicemail, SMS messages, etc.), intended for user device 210, to client device 265. In this example implementation, a user, of user device 210, would like to send content (e.g., caller ID information), that is intended for user device 210, to client device 265 (such as a set top box).

In another example implementation, provisioning server 240 may be part of the network that provides content to server 230. Assume that provisioning server 240 and server 230 are part of a network that provides television programming content to client device 265, such as a set top box or another type of client device 265, described with regard to FIG. 2. In this example implementation, server 585 may correspond to server 225, described with regard to FIG. 2. Alternatively, server 585 may correspond to multiple servers 225. Assume that server 585 is part of a network that provides information and/or content to user device 210 (e.g., a smart phone, or other user devices 210, described with regard to FIG. 2). The user, of user device 210, may decide to set-up and activate a process to send content, intended for client device 265, to user device 210. In this example implementation, a user, of user device 210, may like to send television programming, that is intended for client device 265, to user device 210 (such as a smart phone).

The user may set-up and activate a joint account to distribute content to user device 210 and client device 265, by using user device 210 (e.g., a smart phone or laptop) to send a login request 505 (as shown in FIG. 5) to provisioning server 240. The user may enter login request 505 via a web page (or other user interface). The web page may use an application programming interface (API) to send messages to provisioning server 240. Login request 505 may correspond to login request 405, described with regard to FIG. 4.

Provisioning server 240 may receive login request 505. Provisioning server 240 may analyze login request and determine that login request 505 is a request to log into a first account (e.g., wireless account, a cable television account). Provisioning server 240 may determine that login request 505 is valid. Provisioning server 240 may determine that a message be sent to user device 210 to confirm that the user has successfully logged into the first account. Provisioning server 240 may generate login success 510. Provisioning server 240 may send login success 510 to user device 210. Login success 510 may correspond to login success 410, described with regard to FIG. 4. User device 210 may receive login success 510.

User device 510 may analyze login success 510 and determine that a message be generated (as described in FIG. 4) and displayed for the user. The user may view a message, associated with login success 510, that the user is successfully logged into the first account. To continue setting up the joint account, the user, using user device 210, may generate a message, requesting the creation of a joint account. User device 210 may receive the input from the user and user device 210 may generate activation request 515. Activation request 515 may initiate the process to create a joint account. User device 210 may determine that activation request 515 be sent to provisioning server 240. User device 210 may send activation request 515 to provisioning server 240.

Provisioning server 240 may receive activation request 515. Activation request 515 may include information similar to information in activation request 415, described with regard to FIG. 4. Provisioning server 240 may analyze activation request 515 and determine that a joint account is to be created. Provisioning server 240 may determine that the login information for a second account is required to create a joint account.

Provisioning server 240 may generate credential request 520 to request user device 210 to send information about the second account. Provisioning server 240 may send credential request 520 to user device 210. Credential request 520 may correspond to credential request 420, described with regard to FIG. 4. User device 210 may receive credential request 520.

User device 210 may analyze credential request 520 and determine that a message be generated and displayed to the user, described with regard to FIG. 4. The user may view the message, associated with credential request 520, on user device 210, requesting information about the second account. The user may enter information about the second account, and using user device 210, may send a message to provisional server 240. User device 210 may generate credentials information 525. User device 210 may send provide credentials information 525 to provisioning server 240. The information sent in credentials information 525 may be similar to information sent in credentials information 425, described with regard to FIG. 4.

Provisioning server 240 may receive credentials information 525. Provisioning server 240 may analyze credentials information 525 and may determine that provisioning server 240 send login request 530 to server 585. Login request 530 may be similar to login request 430, described with regard to FIG. 4. Server 585 may receive login request 530 from provisioning server 240 and may process login request 530 in a similar process to processing login request 430, described with regard to FIG. 4. Server 585 may send confirm account 535 to provisioning server 240. Confirm account 535 may correspond to confirm account 435, described with regard to FIG. 4.

With both the first and second accounts authorized, provisioning server 240 may determine that a request is to be sent to user device 210 for configuring different user devices 210 and client devices 265 to receive content. Provisioning server 240 may generate configuration request 540. Provisioning server 240 may send configuration request 540 to user device 210. Configuration request 540 may correspond to configuration request 440, described with regard to FIG. 4. User device 210 may receive configuration request 540. User device 210 may analyze configuration result 540 and determine that a message be generated that requests the user to determine which user devices 210 and/or client devices 265 are to receive content. User device 210 may generate a message to be displayed to the user that the second account is successfully validated. The message may include a request to the user to configure which user devices 210 and client devices 265 are to receive content. User device 210 may choose which user devices 210 and which client devices 265 are to receive content from a list, described with regard to FIG. 4. User device 210 may choose what type of content is to be distributed to user device 210 or client device 265, described with regard to FIG. 4. User device 210 may choose when the content is to be sent to user device 210 or client device 265, described with regard to FIG. 4. User device 210 may generate a configuration result 545. Configuration result 545 may correspond to configuration result 445, described with regard to FIG. 4. User device 210 may send configuration result 545 to provisioning server 240.

Provisioning server 240 may receive configuration result 545. Provisioning server 240 may analyze configuration request 545 in a process similar to how provisioning server 240 analyzed configuration request 445, described with regard to FIG. 4.

Provisioning server 240 may analyze configuration result 545 and determine that a joint account is to be created. In one example implementation, provisioning server 240 may analyze configuration result 545 and provisioning server 240 may create a joint account. Provisioning server 240 may send a message, including the joint account information, to other network devices (e.g., HLR/switch 275) that may be used to send content, intended for user device 210, to client device 265. Alternatively, provisioning server 240 may send a message, including the joint account information, to other network devices that may be used to send content, intended for client device 265, to user device 210.

In another example implementation, provisioning server 240 may analyze configuration result 545 and provisioning server 240 may determine to send a message to server 225. Server 225 may receive the message and determine to create the joint account and send the name and password for the joint account to provisioning server 240. Server 225 may also send a message, including the joint account information, to other network devices (e.g., HLR/switch 275) that may be used to send content, intended for user device 210, to client device 265.

In another example implementation, provisioning server 240 may analyze configuration result 545 and provisioning server 240 may determine to send a message to server 230. Server 230 may receive the message and determine to create the joint account and send the name and password for the joint account to provisioning server 240. Server 230 may also send a message, including the joint account information, to other network devices that may be used to send content, intended for client device 265, to user device 210.

Provisioning server 240 may determine that a configuration request message be sent to server 585. Provisioning server 240 may generate configuration request 550. Provisioning server 240 may send a configuration request 550 to server 585. Server 585 may receive configuration request 550. Configuration request 550 may include information about the joint account. In one example implementation, if server 585 corresponds to server 225, server 585 may analyze configuration request 550 and determine that configuration request 550 includes information (based on configuration result 545) about which selected user devices 210 are to receive content. Server 585 may analyze configuration request 550 and store the information as described in configuration result 545. In another example implementation, if server 585 corresponds to server 230, server 585 may analyze configuration request 550 and determine that configuration request 550 includes information (based on configuration result 545) about which selected client devices 265 are to receive content. Server 585 may analyze configuration request 550 and store the information as described in configuration result 545.

Server 585 may determine that once the configuration information is received, server 585 may generate a confirmation message. Server 585 may send confirm request 555 to provisioning server 240. Provisioning server 240 may receive confirm request 555.

Provisioning server 240 may analyze confirm request 555 and determine that a registration message be sent to content server 235. Provisioning server 240 may generate register message 560. Provisioning server 240 may send register message 560 to content server 235. Content server 235 may receive register message 560. In one example implementation, content server 235 may analyze register message 560 and determine that register message 560 includes configuration information (described in configuration result 545) about which user device 210 (associated with a particular server 225) is to receive content intended for client device 265. Content server 235 may store the configuration information.

In another example implementation, content server 235 may analyze register message 560 and determine that register message 560 includes configuration information about which client device 265 (associated with a particular server 230) is to receive content intended for user device 210. Content server 235 may analyze provisioning request 560 in a process similar to how content server 235 analyzed provisioning request 460, described with regard to FIG. 4. Content server 235 may store the configuration information.

Content server 235 may generate confirm registration message 565. Content server 235 may send confirm registration message 565 to provisioning server 240. Provisioning server 240 may receive confirm registration message 565. Provisioning server 240 may analyze confirm registration message 565 and provisioning server 240 may determine to send a confirmation message to user device 210. Provisioning server 240 may generate confirm registration message 570. Provisioning server 240 may send confirm registration message 570 to user device 210. In one example implementation, confirm registration message 570 may be similar to confirm registration message 565. In another example implementation, confirm registration message 570 may be a modified version of confirm registration message 565. In another example implementation, confirm registration message 570 may be a new message, based on confirm registration message 565.

User device 210 may receive confirm registration message 570. User device 210 may analyze confirm registration message 570 and generate a message for the user to view on user device 210. The user may view the message that confirms that user device 210 or client device 265 are receiving the content as requested by the user.

With a joint account, the user may use the joint account identification and password through a web page (or other user interface) associated with the user's account served by server 225, or associated with the user's account served by server 230. The user may send a message, similar to configuration result 545, to provisioning server 240 that may allow the user to send other types of content to user device 210 and/or client device 265. For example, if the user set up the joint account to send caller ID information, the user may send an additional message, similar to configuration result 545, to provisioning server 240, to request to send SMS messages to client device 265. Alternatively, the user may use the joint account to stop sending information. For example, the user may send another message, similar to configuration result 545, to stop sending caller ID information to previously selected client device 265. This is may result in other network devices (e.g., content server 235, server 225, server 230) being notified to remove information associated with configuration result 545.

Figure 6:
FIG. 6 is a flow chart of an example process for creating a joint account to send content.

FIG. 6 is a flow chart of an example process 600 for creating a joint account for sending content. In one example implementation, process 600 may be performed by provisioning server 240. In another example implementation, one or more blocks of process 600 may be performed by one or more other devices, such as server 225 or server 230.

Process 600 may include receiving login information for a first account (block 610). For example, provisioning server 240 may receive login information for a first account as described with regard to FIG. 4 or FIG. 5. Provisioning server 240 may authenticate the login information, described with regard to FIG. 4 or FIG. 5.

Process 600 may include receiving a request to create and activate a joint account (block 620). For example, provisioning server 240 may receive a message from user device 210 to activate a joint account, described with regard to FIG. 4 or FIG. 5.

Process 600 may include sending a request for login information for a second account (block 630). For example, provisioning server 240 may send a request for login information for a second account, described with regard to FIG. 4 or FIG. 5. Provisioning server 240 may receive, from user device 210, login information for the second account, described with regard to FIG. 4 or FIG. 5. Provisioning server 240 may authenticate the login information for the second account, described with regard to FIG. 4 or FIG. 5.

Process 600 may include receiving configuration information (block 640). For example, provisioning server 240 may receive, from user device 210, what content that is to be distributed and which devices (e.g., configuration result 445, described with regard to FIG. 4) are to receive the content, described with regard to FIG. 4 or FIG. 5. Provisioning server 240 may send the type of content and information about which devices are to receive the content to other network devices (e.g., server 225, server 230, content server 235), described with regard to FIG. 4 or FIG. 5.

Process 600 may include creating a joint account (block 650). In one example implementation, provisioning server 240 may create a joint account, described with regard to FIG. 5. In another example implementation, provisioning server 240 may send a request to another network device (server 225 or server 230) to create the joint account, described with regard to FIG. 4.

Process 600 may include sending joint account information (block 660). For example, provisioning server 240 may send joint account information (name and password) to user device 210 and to other network devices (server 225, server 230), described with regard to FIG. 4 or FIG. 5.

Figure 7:
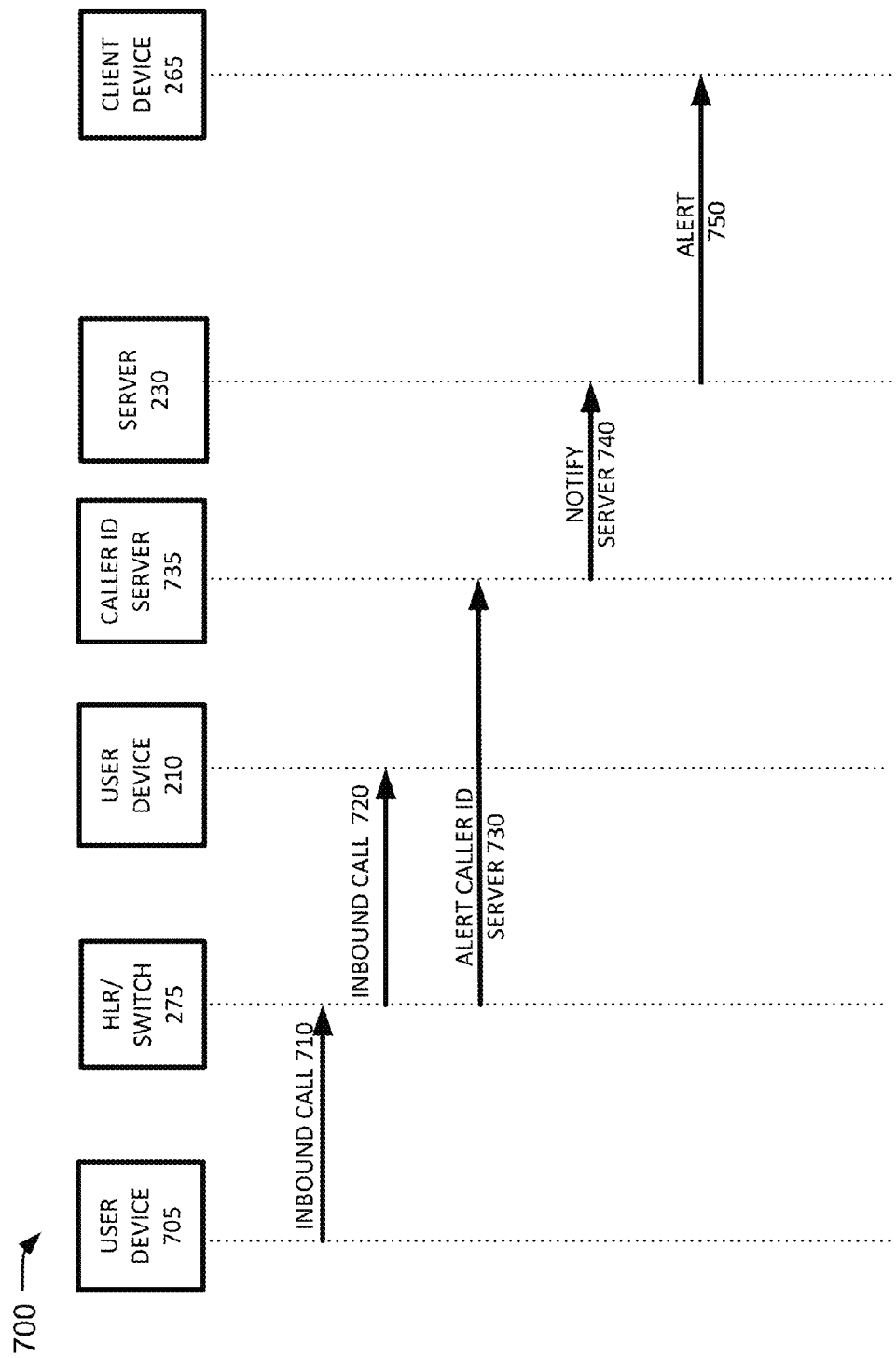
FIG. 7 is a call flow diagram of an example process for sending caller identification information.

FIG. 7 is a call flow diagram of an example process for sending caller ID information being performed by an example portion 700 of environment 200. As shown in FIG. 7, portion 700 may include user device 210, server 230, client device 265, HLR/switch 275, user device 705, and caller ID server 735. User device 210, server 230, client device 265, and HLR/switch 275, may include components and/or perform functions described above in connection with, for example, one or more FIGS. 1-3. User device 705 may correspond to user device 210, described with regard to FIG. 2. Caller ID server 735 may correspond to content server 235, described with regard to FIG. 2.

A user, of user device 705 (such as a smart phone), may decide to call a user, of user device 210. Assume that a joint account has been set up, to send incoming caller ID information, intended for user device 210, to client device 265, described with regard to FIG. 4 or FIG. 5.

As shown in FIG. 7, user device 705 may send an inbound call 710 to HLR/switch 275. HLR/switch 275 may receive inbound call 710. Inbound call 710 may include information about the user (e.g., a name or another identifier) and/or user device 705 (e.g., phone number, MDN, or other identifier). Additionally, or alternatively, inbound call 710 may include call information about user device 210, such as location, identifier, MDN number, or any other type of information. HLR/switch 275 may determine, using the information in inbound call 710, the location of user device 210. HLR/switch 275 may generate inbound call 720.

HLR/switch 275 may send inbound call 720 to user device 210. User device 210 may receive inbound call 720. In one example implementation, inbound call 720 may be similar to inbound call 710. In another example implementation, inbound call 720 may be a modified version of inbound call 710. In another example implementation, inbound call 720 may be a new message based on inbound call 710.

User device 210 may be turned on or turned off. The user, of user device 210, may select to accept (e.g., to answer the incoming call) the call, or to decide not to accept the call.

HLR/switch 275 may send alert caller ID server message 730 to caller ID server 735. HLR/switch 275 may have received configuration result 445, described with regard to FIG. 4 (or configuration result 545, described with regard to FIG. 5) that indicates that HLR/switch 275 is to send inbound call 720 to caller ID server 735. Caller ID server 735 may receive alert caller ID server message 730. Alert caller ID server message 730 may include a name of the user of user device 705 and/or a MDN, or other type of phone number, identifying user device 705. Caller ID server message 730 may send caller ID information to a specified server 230, described with regard to FIG. 4 or FIG. 5.

Caller ID server 735 may analyze alert caller ID server message 730 and caller ID server 735 may send a notification message to server 230. Caller ID server 735 may generate notify server message 740. Caller ID server 735 may send notify server message 740 to server 230. Server 230 may receive notify server message 740. Server 230 may analyze notify server message 740 and determine that the caller ID information is to be sent to a client device 265 selected by the user, of user device 210, described with regard to FIG. 4 or FIG. 5. Server 230 may generate alert message 750.

Server 230 may send alert message 750 to client device 265. Client device 265 may receive alert message 750. Client device 265 may determine that alert message 750 includes caller ID information that is to be displayed to a user of client device 265. Client device 265 may have been selected by the user, of user device 210, to receive the caller ID information, described with regard to FIG. 4 or FIG. 5. Client device 265 may be connected to a television or another type of display device, such as display device 270. The caller ID information, including the number and/or name of the user of user device 705, may be displayed on a television. For example, alert message 750 may be displayed on the television screen as "Incoming call—Jane (505) 555-1313." Alternatively, alert message 750 may be include information about user device 210, such as "Mary (905) 555-1212 receiving incoming call from Jane (505) 555-1313."

Figure 8:
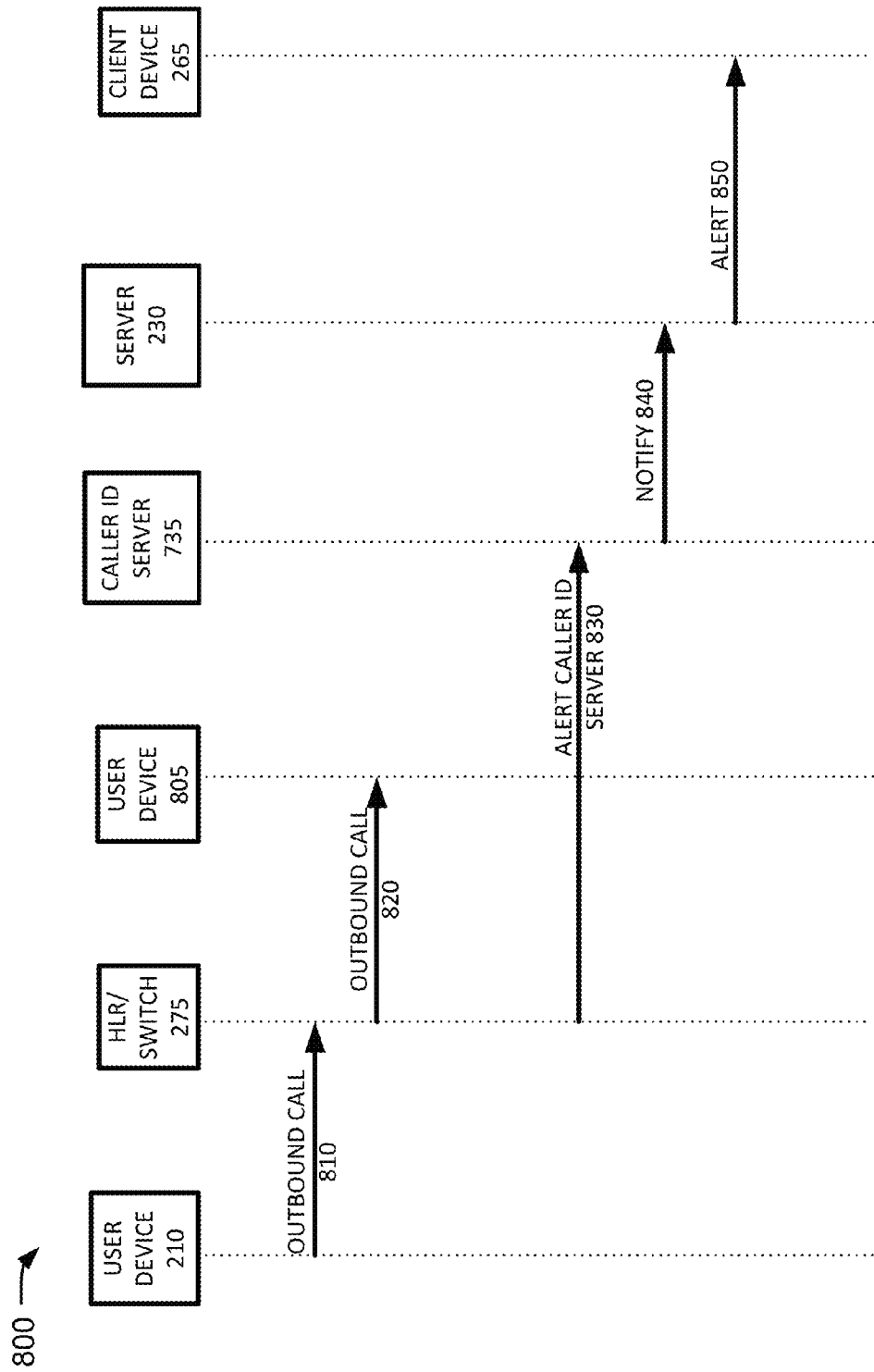
FIG. 8 is a call flow diagram of an example process for sending caller identification information.

FIG. 8 is a call flow diagram of an example process for sending caller ID information being performed by an example portion 800 of environment 200. As shown in FIG. 8, portion 800 may include user device 210, HLR/switch 275, user device 805, caller ID server 735, server 230, and client device 265. User device 210, HLR/switch 275, server 230, and client device 265 may include components and/or perform functions described above in connection with, for example, one or more FIGS. 1-3. Caller ID server 735 is described above with regard to FIG. 7. User device 805 may correspond to user device 210, described with regard to FIG. 2.

The user, of user device 210, may decide to make to an outbound call to another user device, such as user device 805. Assume that a joint account has been set up, to send outgoing caller ID information, for a call from user device 210, to client device 265, described with regard to FIG. 4 or FIG. 5. As shown in FIG. 8, user device 210 may send outbound call 810 to HLR/switch 275. HLR/switch 275 may receive outbound call 810. Outbound call 810 may include information about the user (e.g., name or identifier), of user device 210, and user device 210 (e.g., MDN or other type of identifier). Additionally, or alternatively, outbound call 810 may include information about the user (e.g., name or identifier), of user device 805, and user device 805 (e.g., MDN or other type of identifier).

HLR/switch 275 may determine the location of user device 805. HLR/switch 275 may send outbound call 820 to user device 805. User device 805 may receive outbound call 820 from HLR/switch 275. In one example implementation, outbound call 820 may be similar to outbound call 810. In another example implementation, outbound call 820 may be a modified version of outbound call 810. User device 805 may be on or off. The user, of user device 805, may accept outbound call 810 and talk to the user, of user device 210. Alternatively, the user, of user device 805, may not accept outbound call 810 and may decide not to talk to the user of user device 210.

HLR/switch 275 may analyze outbound 810 and determine that an alert message is to be sent to caller ID server 735. HLR/switch 275 may generate alert caller ID server message 830. HLR/switch 275 may have received configuration result 445 (or configuration result 545), described with regard to FIG. 4 or FIG. 5, that requests that HLR/switch 275 send caller ID information associated with an outbound to caller ID server 735. HLR/switch 275 may send alert message 830 to caller ID server 735. Caller ID server 735 may receive alert message 830. Alert message 830 may include caller ID information about user device 805, such as the identifier for the user (e.g., a name), of user device 805, and user device 805 (e.g., a phone number). Caller ID server 735 may (as described with regard to FIG. 4 or FIG. 5) send the caller ID information, about user device 805, to a specific client device 265 (described with regard to FIG. 4 or FIG. 5).

Caller ID server 735 may send notify message 840 to server 230. Server 230 may receive notify message 840. Notify message 840 may include which client device 265 should receive the caller ID information regarding user device 805. Server 230 may (as described with regard to FIG. 4 or FIG. 5) send the caller ID information to a specified client device 265 determined by the user of user device 210, described with regard to FIG. 4 or FIG. 5. Server 230 may generate alert message 850.

Server 230 may send alert message 850 to client device 265. Client device 265 may receive alert 850. Client device 265 may analyze alert message 850 and determine that the caller ID information be sent to display device 270, such as a television. Alert message 850 may include the caller ID information (e.g., name and/or phone number of user device 805). Client device 265 (e.g., a set top box) may be connected to display device 270, such as a television. The caller ID information (including the number and/or name of the user of user device 805) may be displayed on the television or other display device. For example, alert message 850 may be displayed on the television screen as "outbound call to Tom (909) 555-1212." Alternatively, alert message 850 may be include information about user device 210, such as "Mary (505) 555-1212 making outbound call to Tom (909) 555-1212."

Figure 9:
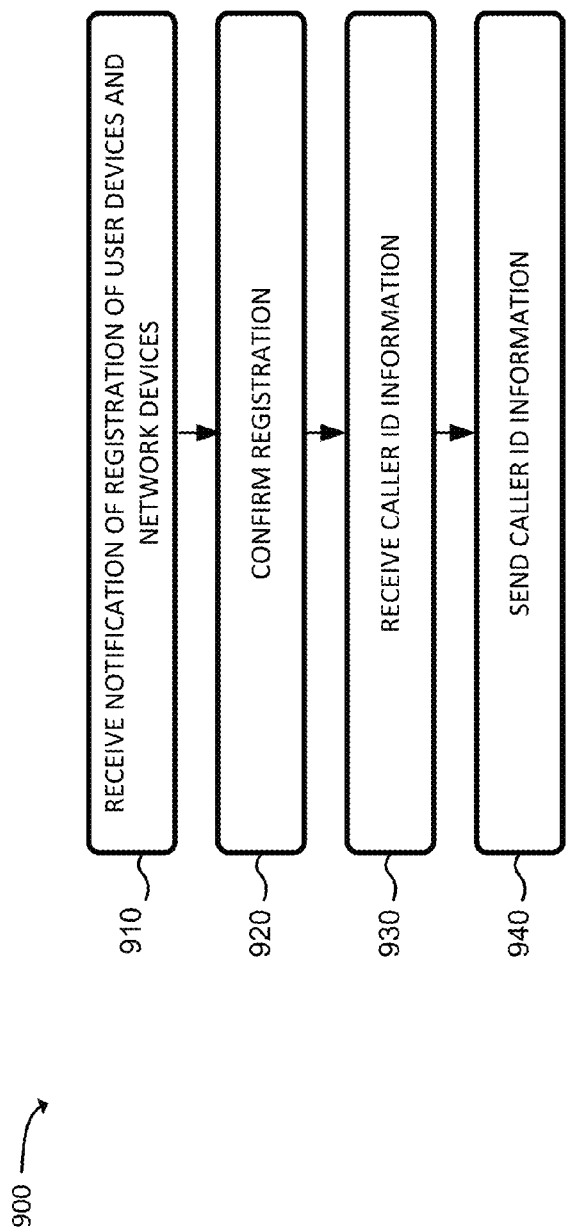
FIG. 9 is a flow chart of an example process for sending caller identification information.

FIG. 9 is a flow chart of an example process 900 for sending caller ID information. In one example implementation, process 900 may be performed by caller ID server 735. In another implementation, one or more blocks of process 900 may be performed by one or more other devices, such as server 225 or server 230.

Process 900 may include receiving notification of registration of user devices and network devices (block 910). For example, caller ID server 735 may receive a notification from provisioning server 240 that caller ID server 735 is to forward caller ID information to server 230. The server 230 is specified by the user, of user device 210 (e.g., configuration result 465, described with regard to FIG. 4) at the time that a particular client device 265 is selected.

Process 900 may include sending a confirm registration message (block 920). For example, caller ID server 735 may send a confirm registration message, such as confirm registration 465, described with regard to FIG. 4.

Process 900 may include receiving caller ID information (block 930). For example, caller ID server 735 may receive caller ID information from user device 210, via HLR/switch 275. In one example implementation, caller ID server 735 may receive the caller ID information for an incoming call to user device 210, described with regard to FIG. 7. In another example implementation, caller ID server 735 may receive the caller ID information for an outbound call being made by the user, of user device 210, described with regard to FIG. 8.

Process 900 may include sending the caller ID information (block 940). For example, caller ID server 735 may send the caller ID information to client device 265. For example, client device 265 may be specified by the user in configuration result 445, described with regard to FIG. 4. Client device 265 may send the caller ID information to a display device (such as a television), so that the caller ID information may be displayed.

Figure 10A:
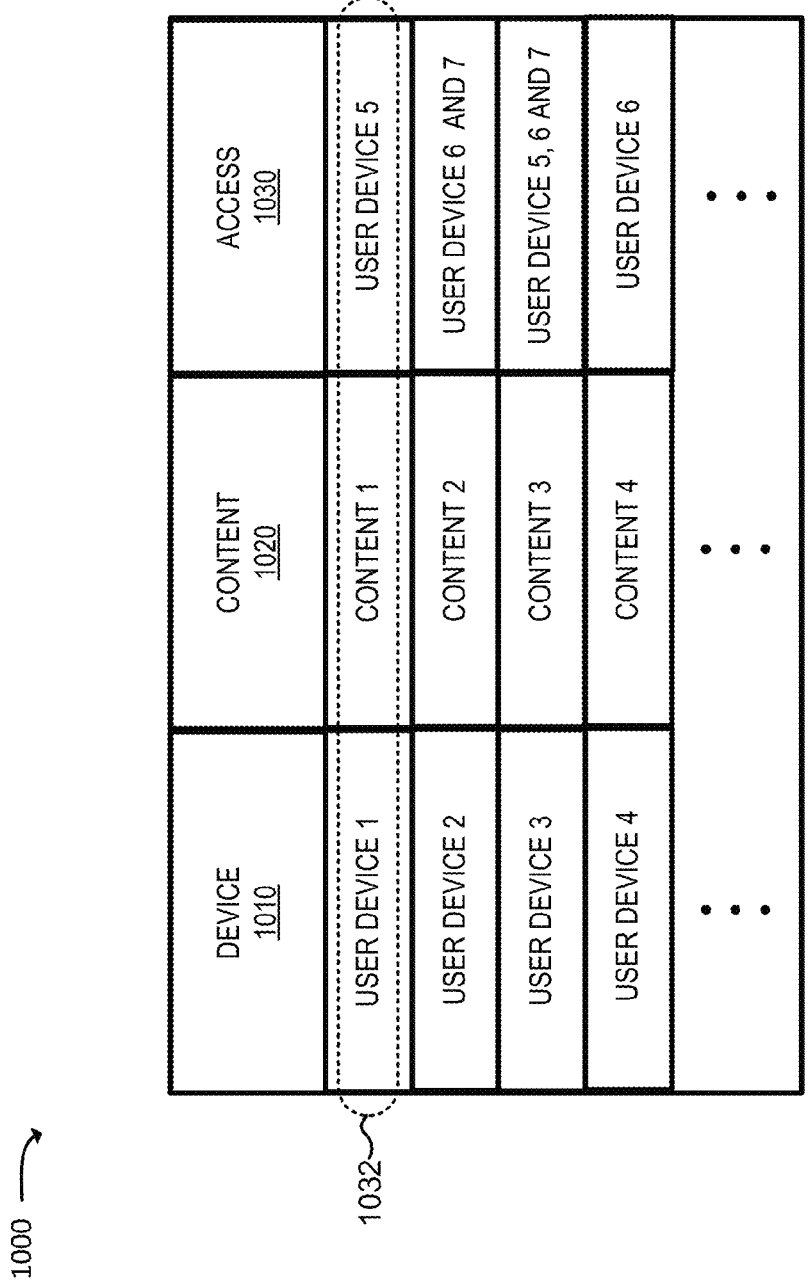
FIGS. 10A-10B are diagrams of example data structure that stores content.

FIG. 10A is a diagram of an example data structure 1000 that stores information used to distribute content. In one example implementation, server 225 may store some or all of data structure 1000. Additionally, or alternatively, server 230 may store some or all of data structure 1000. Alternatively, or additionally, provisioning server 240 may store some or all of data structure 1000. Additionally, or alternatively, data structure 1000 may be stored in memory, associated with another device or a group of devices, separate from or in combination with the memory associated with server 225, server 230, and/or provisioning server 240.

Data structure 1000 may include a collection of fields, such as a device field 1010, content field 1020, and access field 1030. Although FIG. 10A shows example fields 1010-1030, in other implementations, data structure 1000 may include fewer fields, different fields, additional fields, and/or differently arranged fields than depicted in FIG. 10A. Additionally, or alternatively, one or more fields of data structure 1000 may include information described as being included in one or more other fields of data structure 1000.

In one example implementation, device type field 1010 may store an alias, name, or any other unique identifier for client device 265 when data structure 1000 is associated with server 225. As shown within ellipse 1032 in the example of FIG. 10A, an alias for user device 210 may be "user device 1." In another example implementation, device type field 1010 may store an alias, name, or any other unique identifier for user device 210 when data structure 1000 is associated with server 230.

Content field 1020 may store an identifier for the type of content to allow sending the content a specified user device 210, or a specified client device 265. Content field 1020 may also store any time restrictions associated with the content. For example, the user, of user device 210, may have chosen not to have any caller ID information displayed, on a television associated with client device 265, during the weekend. Alternatively, the user may have chosen to suspend caller ID information during a one week interval of time.

Access field 1030 may store particular information about which user devices 210, or client devices 265, may receive the content, identified in content field 1020. In one example implementation, access field 1030 may identify client devices 265 when data structure 1000 is associated with server 230. In another example implementation, access field 1030 may identify user devices 210 when data structure 1000 is associated with server 225.

In one example implementation, server 230 may receive configuration result 445, described with regard to FIG. 4. For example, configuration result 445 may include sending content 1 (caller ID information), intended for user device 1 (e.g., user device 210, such as a smart phone), to user device 5 (e.g., client device 265, such as a set top box). Server 230 may analyze data structure 1000 and determine that the caller ID information, intended for user device 1, is to be sent to user device 5 (set top box).

In another example implementation, server 225 may receive configuration result 445, described with regard to FIG. 4. For example, configuration result 445 may include sending content 1 (television program), intended for user device 1 (e.g., client device 265, such as a set top box), to user device 5 (e.g., user device 210, such as a smart phone). Server 225 may analyze data structure 1000 and determine that the content, intended for user device 1, is to be sent to user device 5 (set top box).

Figure 10B:
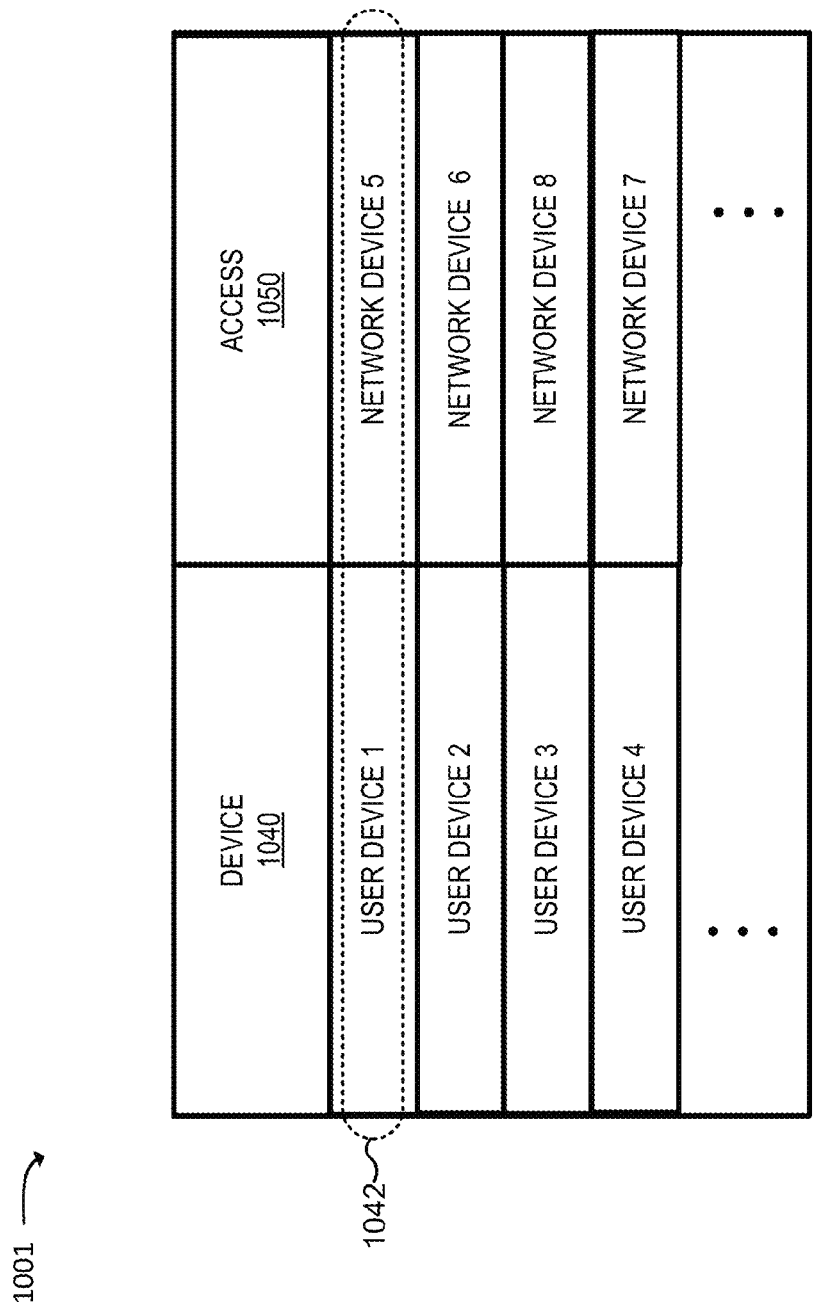

FIG. 10B is a diagram of an example data structure 1001 that stores information used to distribute caller ID information, intended for user device 210, to client device 265. In one example implementation, caller ID server 735 may store some or all of data structure 1001. Additionally, or alternatively, server 230 may store some or all of data structure 1001. Additionally, or alternatively, provisioning server 240 may store some or all of data structure 1001. Additionally, or alternatively, server 225 may store some or all of data structure 1001. Additionally, or alternatively, data structure 1000 may be stored in memory, associated with another device or a group of devices, separate from or in combination with the memory associated with application server 225, server 230 provisioning server 240 and/or caller ID server 735.

Data structure 1001 may include a collection of fields, such as a device field 1040 and access field 1050. Although FIG. 10B shows example fields 1040-1050, in other implementations, data structure 1001 may include fewer fields, different fields, additional fields, and/or differently arranged fields than depicted in FIG. 10B. Additionally, or alternatively, one or more fields of data structure 1001 may include information described as being included in one or more other fields of data structure 1001.

Device type field 1040 may store an alias, name, or any other unique identifier for user device 210. As shown within ellipse 1042 in the example of FIG. 10B, an alias for user device 210 may be "user device 1."

Access field 1050 may store particular information about a network device that may receive caller ID information intended for user device 210 as defined in device field 1040. Access field 1050 may store an alias, name, or any other unique identifier for server 230. The selected server 230 may receive caller ID information, intended for a user device defined in device field 1040.

In an example implementation, caller ID server 735 may receive a message from HLR/switch 275. Caller ID server 735 may analyze the message and determine, using data structure 1001, that the caller ID information, intended for user device 1, should be sent to network device 5. Network device 5 may determine (using data structure 1000, as described in FIG. 10A) which client device 265 is to receive the caller ID information.

Figure 11A:
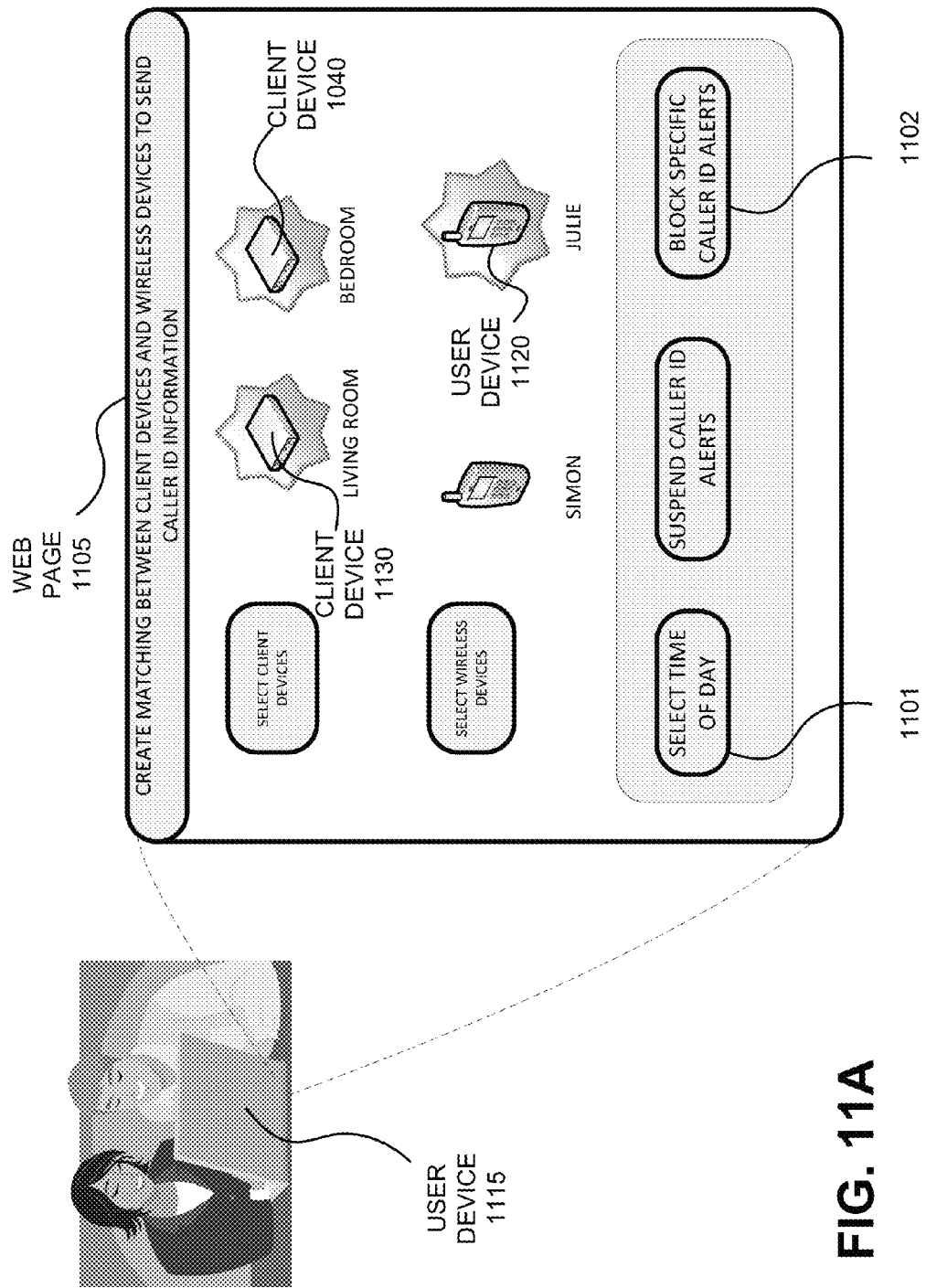
FIGS. 11A-11C are diagrams of an example process for sending caller identification information.
Figure 11B:
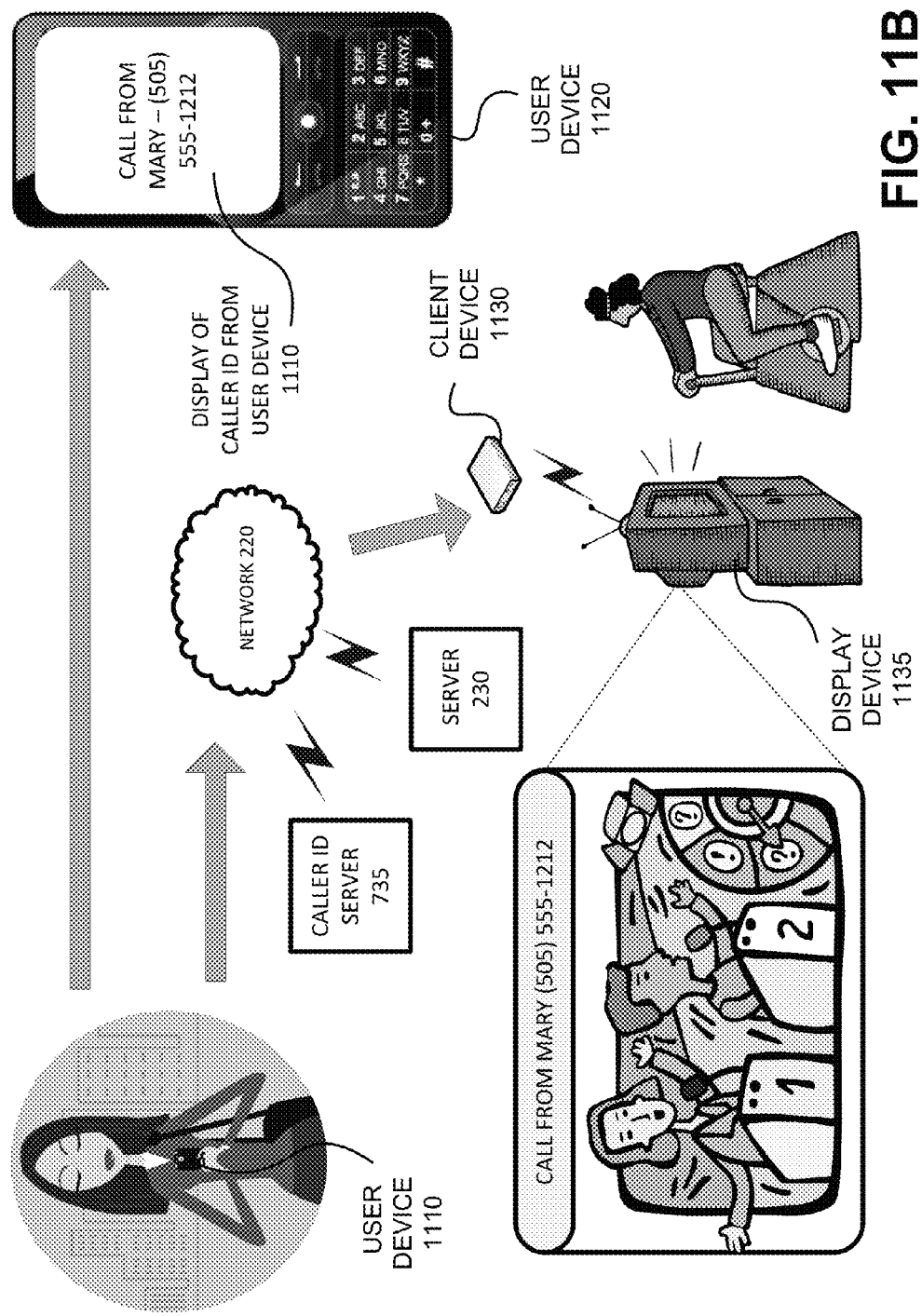
Figure 11C:
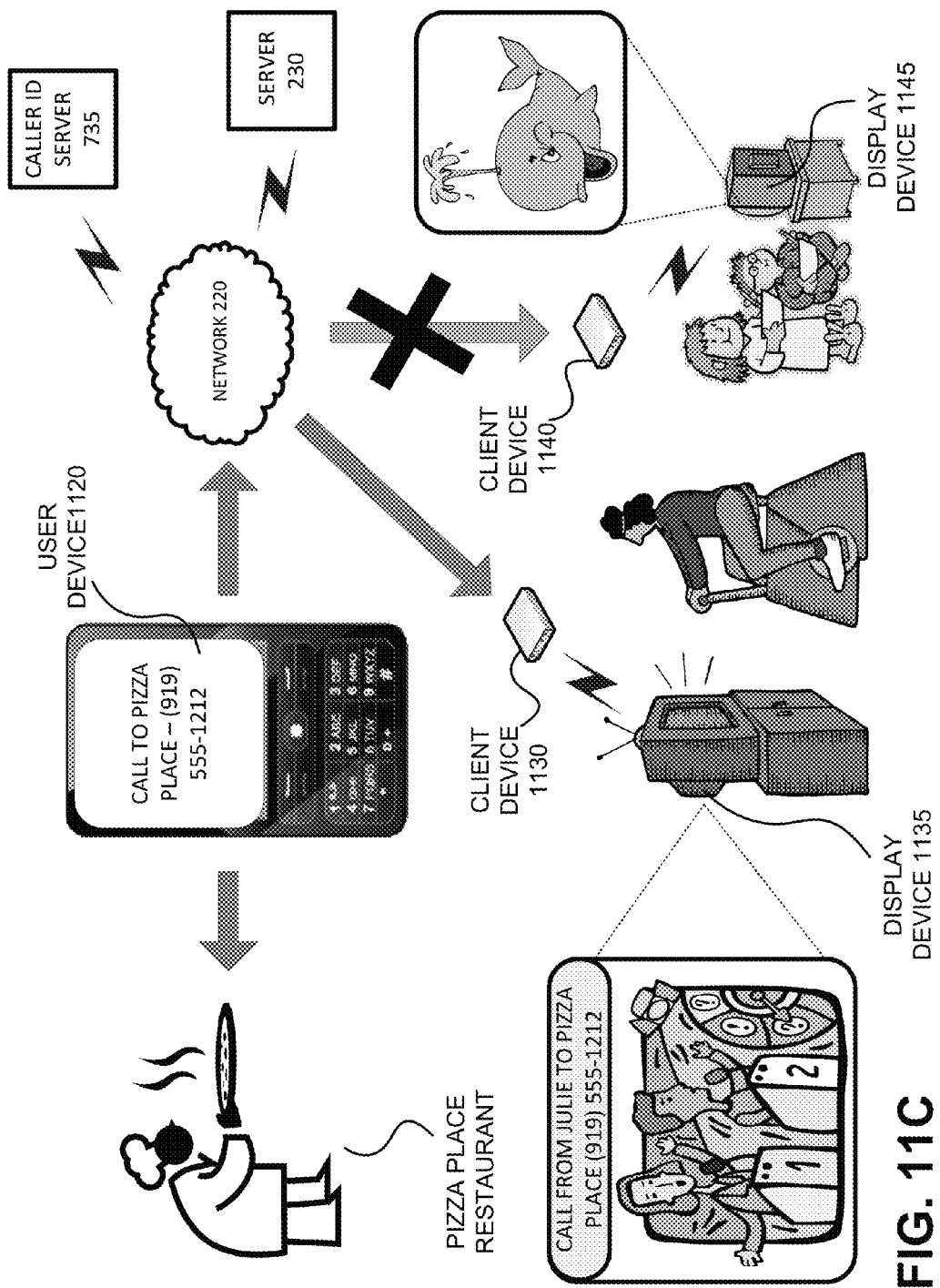

FIGS. 11A-11C are diagrams of example processes for sending caller ID information. FIGS. 11A-11C shows network 220, server 230, caller ID server 735, web page 1105, user device 1110, user device 1115, user device 1120, client device 1130, display device 1135, client device 1140, and display device 1145. User device 1115, user device 1120, and user device 1130 may all correspond to user device 210, described with regard to FIG. 2. Client device 1130 and client device 1140 may both correspond to client device 265, described with regard to FIG. 2. Display device 1135 and display device 1145 may correspond to display device 270.

In FIG. 11A, a user ("Julie"), of user device 1115, decides to set up a configuration of different user devices to receive caller ID information. Assume that Julie has already set up and activated a joint account (described with regard to FIG. 4 or FIG. 5). Julie decides, using web page 1105, that she would like to send caller ID information, intended on her smart phone (user device 1120), to set top boxes in the living room (client device 1130) and in the bedroom (client device 1140). Julie further decides to block specific caller ID alerts, as shown on web page 1105. Julie decides that any incoming or outgoing calls that she makes from user device 1120 will not be displayed on the television associated with the set top box (client device 1130) in the living room between the hours of 6:00 p.m. and 6:00 a.m. Further, Julie decides that any incoming calls may be displayed at all times on the television associated with the set top box (client device 1140) in the bedroom.

As shown in FIG. 11B, Julie may be working out in front of the television located in the bedroom. It is Monday morning at 10:00 a.m. Julie's friend, Mary, decides to make a call, using user device 1110, to user device 1120. The caller ID information, associated with user device 1110, may be sent to user device 1120 and caller ID server 735. Caller ID server 735 may send caller ID information to server 230, via network, 220, and server 230 may send the caller ID information to set top boxes determined by Julie's selection of devices, described with regard to FIG. 11A.

Since Julie decided that caller ID information is to be displayed on the television in the bedroom, caller ID server 735 may send the caller ID information, for user device 1110, to the set top box (client device 1130) located in the bedroom. As shown in FIG. 11B, Julie may view a message on her bedroom television (display device 1135) that displays caller ID information from user device 1110 ("Call from Mary (505) 555-1212").

As shown in FIG. 11C, Julie is again working out in front of her television located in the bedroom. Also, Julie's children are watching at show on the television located in the living room. It is Friday evening at 7:00 p.m.

Julie's husband, Robert, decides to make a call to order pizza, from the local pizza restaurant, using user device 1120. As Robert calls the pizza restaurant, the caller ID information of the pizza restaurant ("Pizza Place") appears on the television in the bedroom. Julie has configured the set top box (client device 1130) in the bedroom to show incoming and outbound phone calls from user device 1120, as described in FIG. 11A. User device 1120 may send a message to caller ID server 735. Caller ID server 735 may send the caller ID information associated with the outbound call, via network 220, to server 230. Server 230 may determine that the outbound phone call is to be sent to the set top box (client device 1130) in the bedroom. Thus, Julie will see a message ("call from Julie to Pizza Place (919) 555-1212") on her television (display device 1135) in the bedroom. Julie also configured that the set top box (client device 1140) not to display inbound or outbound phone calls between the hours of 6:00 p.m and 6:00 a.m. Thus, caller ID server 735 may not send any outbound caller ID information to the set top box (client device 1140) that provides programming to the television (display device 1145) in the living room. Thus, the children, who are watching cartoons, will not see the message regarding the outbound call to the pizza restaurant displayed on the living room television.

Systems and/or methods described herein may allow for a user, of a user device, to set up and activate a service that allows for distributing content, intended for one user device, to one or more different types of user devices.

The foregoing description of implementations provides illustration and description, but is not intended to be exhaustive or to limit the implementations to the precise form disclosed. Modifications and variations are possible in light of the above disclosure or may be acquired from practice of the implementations.

While series of blocks have been described with regard to FIGS. 6 and 9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
    receiving, by a first network device, a message that identifies a relationship between a wireless user device and a client device,
        the relationship being associated with sending caller identification information, for a call associated with the wireless user device, to the client device;
    storing, by the first network device, information identifying the relationship;
    receiving, by the first network device, the caller identification information for the call associated with the wireless user device;

determining, by the first network device, to send the caller identification information to the client device based on the information identifying the relationship stored by the first network device; and
sending, by the first network device, the caller identification information to the client device.

2. The method of claim 1, further comprising:
receiving a second message that identifies a second relationship between a second wireless user device and the client device,
the second relationship being associated with sending second caller identification information, for a call associated with the second wireless user device, to the client device;
storing information identifying the second relationship;
receiving the second caller identification information for the call associated with the second wireless device;
determining to send the second caller identification information to the client device based on the information identifying the second relationship; and
sending the second caller identification information to the client device.

3. The method of claim 1, where the wireless user device is associated with a first account and the client device is associated with a second account,
the first account being different than the second account.

4. The method of claim 1, where the caller identification information is associated with an incoming call to the wireless user device.

5. The method of claim 1, where the caller identification information is associated with an outbound call being sent from the wireless user device.

6. The method of claim 1, further comprising:
receiving a second message to remove the information identifying the relationship, between the wireless user device and the client device, stored by the first network device;
removing the information identifying the relationship from a memory associated with the first network device based on receiving the second message; and
discontinuing, based on removing the information identifying the relationship, to send the caller identification information, for the calls associated with the wireless user device, to the client device.

7. The method of claim 1, further comprising:
receiving a second message to change the relationship, between the wireless user device and the client device, to a new relationship between the wireless user device and a second client device; and
sending the caller identification information, based on receiving the second message, to the second client device.

8. A non-transitory computer-readable medium storing instructions, the instructions comprising:
one or more instructions that, when executed by one or more processors of one or more network devices, cause the one or more processors to:
receive information identifying a relationship between a wireless user device and a client device,
the relationship being associated with sending caller identification information, for a call associated with the wireless user device, to the client device,
the wireless user device being associated with a first service provider, and
the client device being associated with a second service provider,
the first service provider being different from the second service provider;
receive the caller identification information for the call associated with the wireless user device;
determine to send the caller identification information to the client device based on the information identifying the relationship; and
send the caller identification information to the client device.

9. The non-transitory computer-readable medium of claim 8, where the instructions further comprise:
one or more instructions that, when executed by the one or more processors, cause the one or more processors to:
receive information identifying a second relationship between the wireless device and a second client device,
the second relationship being associated with sending other caller identification information, for another call associated with the wireless user device, to the second client device;
receive the second caller identification information for the other call associated with the wireless user device;
determine to send the second caller identification information to the second client device based on the information identifying the second relationship; and
send the second caller identification information to the second client device.

10. The non-transitory computer-readable medium of claim 9, where the one or more instructions to send the second caller identification information to the second client device include:
one or more instructions that, when executed by the one or more processors, cause the one or more processors to:
send the second caller identification information to the second client device without sending the second caller identification information to the client device.

11. The non-transitory computer-readable medium of claim 8, where the instructions further comprise:
one or more instructions that, when executed by the one or more processors, cause the one or more processors to:
receive a second message to send the caller identification information to a second client device; and
send, based on receiving the second message, the caller identification information to the second client device.

12. A system comprising:
one or more network devices to:
receive a message that identifies a relationship between a wireless user device and a client device,
the relationship allowing caller identification information, for a call associated with the wireless user device, to be sent to the client device;
store information identifying the relationship;
receive the caller identification information for the call associated with the wireless user device;
determine to send the caller identification information to the client device based on the information identifying the relationship; and
send the caller identification information to the client device.

13. The system of claim 12, where, when receiving the message that identifies the relationship between the wireless user device and the client device, the one or more network devices are to:

receive information identifying a time period associated with sending the caller identification information to the client device; and where, when sending the caller identification information to the client device, the one or more network devices are to:

send the caller identification information to the client device only during the time period.

14. The system of claim 12, where, when receiving the message that identifies the relationship between the wireless user device and the client device, the one or more network devices are to:

receive information identifying a time period during which caller identification is not to be sent to the client device; and where, when sending the caller identification information to the client device, the one or more network devices are to:

determine not to send the caller identification information to the client device during the time period.

15. The system of claim 12, where the one or more network devices are further to:

receive a second message that identifies a second relationship between the wireless user device and a second client device, the second relationship being associated with sending other caller identification information, for a call associated with the wireless user device, to the second client device;

store information regarding the second relationship;

receive other caller identification information for the call associated with the wireless user device;

determine to send the other caller identification information to the second client device based on the information regarding the second relationship; and send the other caller identification information to the second client device.

16. The system of claim 15, where, when receiving the second message that identifies the relationship between the wireless user device and the second client device, the one or more network devices are to:

receive information regarding television programming; and where, when sending the other caller identification information to the second client device, the one or more network device are to:

prevent the other caller identification information from being sent to the second client device during a transmission of the television programming.

17. The system of claim 15, where the caller identification information is associated with an inbound call received by the wireless user device, and where the other caller identification information is associated with an outbound call sent from the wireless user device.

18. The system of claim 12, where the one or more network devices are further to:

receive a second message indicating an interval of time during which the caller identification information is to be sent to the client device; and where, when sending the caller identification information, the one or more network devices are to:

send, based on the second message, the caller identification to the client device during the interval of time.

19. The system of claim 12, where the one or more network devices are further to:

receive a second message indicating that the caller identification information is to be sent to a second client device instead of the client device; and send, based on the second message, the caller identification information to the second client device.

20. The system of claim 12, where the one or more network devices are further:

receive information identifying a first account and a second account, the first account being associated with the wireless user device, and the second account being associated with the client device;

receive information regarding the wireless user device and the client device;

receive information regarding a type of content associated with the wireless user device, the type of content corresponding to the caller identification information; and create a joint account based on the information identifying the first account and the second account, the information regarding the wireless user device and the client device, and the information regarding the type of content.

* * * * *